United States Patent
Ryu et al.

(10) Patent No.: US 11,223,468 B1
(45) Date of Patent: Jan. 11, 2022

(54) RECEIVER CIRCUIT PERFORMING ADAPTIVE EQUALIZATION AND SYSTEM INCLUDING THE SAME

(71) Applicant: SAMSUNG ELECTRONICS CO., LTD., Suwon-si (KR)

(72) Inventors: Kyungho Ryu, Hwaseong-si (KR); Kyongho Kim, Hwaseong-si (KR); Kilhoon Lee, Seoul (KR); Yeongcheol Rhee, Suwon-si (KR); Taeho Lee, Daejeon (KR); Hyunwook Lim, Seoul (KR); Younghwan Chang, Yongin-si (KR); Sengsub Chun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/194,831

(22) Filed: Mar. 8, 2021

(30) Foreign Application Priority Data

Aug. 18, 2020 (KR) ........................ 10-2020-0103524

(51) Int. Cl.
*H04L 7/00* (2006.01)
*H04L 27/01* (2006.01)

(52) U.S. Cl.
CPC ............ *H04L 7/0016* (2013.01); *H04L 27/01* (2013.01)

(58) Field of Classification Search
CPC ..... H04L 7/0016; H04L 7/002; H04L 7/0025; H04L 7/0029; H04L 27/01; H04L 7/00; H04L 7/01; H04L 7/033–0338; H04L 25/00; H04L 25/02; H04L 25/03; H04L 25/03006; H04L 25/03178; H04L 25/03286; H04L 25/03248; H04L 25/03254; H04L 25/03267
See application file for complete search history.

(56) References Cited

U.S. PATENT DOCUMENTS

| | | | | |
|---|---|---|---|---|
| 3,820,030 A | * | 6/1974 | Williams | G11B 20/1419 327/160 |
| 5,757,857 A | * | 5/1998 | Buchwald | H04L 7/0274 329/306 |

(Continued)

OTHER PUBLICATIONS

Choi et al., IEEE Journal of Solid-State Circuits, vol. 39 (3), Mar. 2004.
(Continued)

*Primary Examiner* — James M Perez
(74) *Attorney, Agent, or Firm* — Lee IP Law, PC

(57) ABSTRACT

A receiver circuit includes an equalizer configured to generate an equalization signal by equalizing an input data signal transferred through a communication channel based on an equalization coefficient; a clock data recovery circuit configured to generate a data clock signal and an edge clock signal based on the equalization signal, generate a data sample signal including a plurality of data bits by sampling the equalization signal in synchronization with the data clock signal, and generate an edge sample signal including a plurality of edge bits by sampling the equalization signal in synchronization with the edge clock signal; and an equalization control circuit configured to control the equalization coefficient by comparing the plurality of data bits and the plurality of edge bits.

18 Claims, 23 Drawing Sheets

(56) References Cited

U.S. PATENT DOCUMENTS

| | | | | |
|---|---|---|---|---|
| 5,966,415 A * | 10/1999 | Bliss | | G11B 20/10009 |
| | | | | 375/341 |
| 6,055,119 A * | 4/2000 | Lee | | H04N 5/935 |
| | | | | 360/51 |
| 6,389,090 B2 * | 5/2002 | Zortea | | H03L 7/0814 |
| | | | | 327/158 |
| 6,434,083 B2 * | 8/2002 | Lim | | G11C 7/22 |
| | | | | 365/233.12 |
| 6,509,773 B2 * | 1/2003 | Buchwald | | H03L 7/0816 |
| | | | | 327/248 |
| 6,760,372 B1 * | 7/2004 | Zortea | | H04L 7/0334 |
| | | | | 375/232 |
| 6,995,594 B2 * | 2/2006 | Buchwald | | H03L 7/0814 |
| | | | | 327/248 |
| 7,245,638 B2 * | 7/2007 | Agazzi | | H03M 1/0624 |
| | | | | 370/516 |
| 7,346,130 B2 * | 3/2008 | Kobylinski | | H04L 25/0204 |
| | | | | 375/341 |
| 7,409,031 B1 * | 8/2008 | Lee | | H03L 7/07 |
| | | | | 375/376 |
| 7,486,894 B2 * | 2/2009 | Aronson | | H04B 10/40 |
| | | | | 398/128 |
| 7,564,866 B2 * | 7/2009 | Agazzi | | H03M 1/0624 |
| | | | | 370/463 |
| 7,639,737 B2 * | 12/2009 | Palmer | | H04L 25/03273 |
| | | | | 375/232 |
| 7,643,599 B2 * | 1/2010 | Willis | | H03D 13/003 |
| | | | | 375/371 |
| 7,656,939 B2 * | 2/2010 | Gondi | | H04L 25/03885 |
| | | | | 375/229 |
| 7,697,649 B2 * | 4/2010 | Okamura | | H04L 25/03006 |
| | | | | 375/355 |
| 7,778,286 B2 * | 8/2010 | Agazzi | | H04B 10/6933 |
| | | | | 370/516 |
| 7,831,005 B2 * | 11/2010 | Kuwata | | H04L 7/0091 |
| | | | | 375/371 |
| 7,885,367 B2 * | 2/2011 | Nishimura | | H04L 7/048 |
| | | | | 375/373 |
| 7,974,375 B2 * | 7/2011 | Kim | | H03L 7/0891 |
| | | | | 375/376 |
| 8,050,373 B2 * | 11/2011 | Buchwald | | H04L 25/20 |
| | | | | 375/356 |
| 8,223,828 B2 * | 7/2012 | Buchwald | | H04L 7/0337 |
| | | | | 375/232 |
| 8,351,560 B2 * | 1/2013 | Buchwald | | H04L 25/20 |
| | | | | 375/356 |
| 8,519,758 B2 * | 8/2013 | Lee | | H03L 7/0816 |
| | | | | 327/158 |
| 8,565,296 B2 * | 10/2013 | Shinmyo | | H04L 27/01 |
| | | | | 375/232 |
| 8,634,452 B2 * | 1/2014 | Zerbe | | H04L 25/0296 |
| | | | | 375/227 |
| 8,649,476 B2 * | 2/2014 | Malipatil | | H04L 7/0062 |
| | | | | 375/355 |
| 8,791,735 B1 * | 7/2014 | Shibasaki | | H04L 25/03057 |
| | | | | 327/156 |
| 8,878,792 B2 * | 11/2014 | Lim | | H03L 7/0816 |
| | | | | 345/173 |
| 8,917,803 B1 * | 12/2014 | Asuncion | | H04L 7/033 |
| | | | | 375/354 |
| 8,929,496 B2 * | 1/2015 | Lee | | H04L 7/033 |
| | | | | 375/355 |
| 8,958,504 B2 * | 2/2015 | Warke | | H04L 27/0014 |
| | | | | 375/327 |
| 8,989,329 B2 * | 3/2015 | Hammad | | H04L 7/0079 |
| | | | | 375/355 |
| 9,035,684 B2 * | 5/2015 | Jung | | H03L 7/0818 |
| | | | | 327/158 |
| 9,049,075 B2 * | 6/2015 | Juenemann | | H04L 27/02 |
| 9,059,825 B2 * | 6/2015 | Chi | | H04L 7/0041 |
| 9,106,397 B2 * | 8/2015 | Zerbe | | H04L 25/03038 |
| 9,191,194 B2 * | 11/2015 | Robertson | | H03L 7/0807 |
| 9,264,219 B1 * | 2/2016 | Kang | | H04L 7/033 |
| 9,270,291 B1 * | 2/2016 | Parnaby | | H03M 1/1028 |
| 9,300,500 B2 * | 3/2016 | Cho | | H04L 25/03885 |
| 9,313,017 B1 * | 4/2016 | Liao | | H04L 7/0062 |
| 9,397,872 B2 * | 7/2016 | Kamali | | H04B 3/46 |
| 9,413,524 B1 * | 8/2016 | Xu | | H04L 7/0087 |
| 9,438,409 B1 * | 9/2016 | Liao | | H04L 7/0087 |
| 9,455,848 B1 * | 9/2016 | Zhang | | H04L 7/0062 |
| 9,531,570 B2 * | 12/2016 | Hekmat | | H04L 25/03057 |
| 9,742,594 B2 * | 8/2017 | Dallaire | | H04L 25/03006 |
| 9,762,381 B2 * | 9/2017 | Zhong | | H04L 7/0058 |
| 9,806,917 B2 * | 10/2017 | Norimatsu | | H04L 25/03 |
| 9,960,902 B1 * | 5/2018 | Lin | | H04L 7/0037 |
| 10,009,166 B2 * | 6/2018 | Choi | | H04L 7/033 |
| 10,009,199 B2 * | 6/2018 | Suzuki | | H04L 7/0016 |
| 10,014,907 B2 * | 7/2018 | Choi | | H04B 3/46 |
| 10,038,545 B1 * | 7/2018 | Wu | | H03L 7/0807 |
| 10,236,892 B2 * | 3/2019 | Moballegh | | H03L 7/087 |
| 10,355,700 B2 * | 7/2019 | Lim | | H03L 7/0805 |
| 10,454,485 B1 * | 10/2019 | Malhotra | | H04L 7/007 |
| 10,491,365 B1 * | 11/2019 | Lin | | H03L 7/0807 |
| 10,547,475 B1 * | 1/2020 | Gagnon | | H04L 25/03057 |
| 10,560,291 B2 * | 2/2020 | Lee | | H04L 25/03159 |
| 10,721,106 B1 * | 7/2020 | Hormati | | H04L 25/03019 |
| 10,763,866 B2 * | 9/2020 | Ryu | | H03L 7/0807 |
| 10,791,009 B1 * | 9/2020 | Wu | | H04L 25/03885 |
| 10,848,350 B1 * | 11/2020 | Hossain | | H04L 7/0087 |
| 10,855,437 B1 * | 12/2020 | Chen | | H04L 7/0337 |
| 2001/0038568 A1 * | 11/2001 | Lim | | G11C 7/22 |
| | | | | 365/233.1 |
| 2001/0055319 A1 * | 12/2001 | Quigley | | H04L 12/2801 |
| | | | | 370/480 |
| 2007/0280383 A1 * | 12/2007 | Hidaka | | H04L 25/063 |
| | | | | 375/346 |
| 2008/0247452 A1 * | 10/2008 | Lee | | H04L 25/03019 |
| | | | | 375/232 |
| 2010/0329318 A1 * | 12/2010 | Dai | | H04L 1/20 |
| | | | | 375/224 |
| 2011/0221495 A1 * | 9/2011 | Lee | | G11C 7/222 |
| | | | | 327/158 |
| 2011/0310949 A1 * | 12/2011 | Zerbe | | H04L 25/03885 |
| | | | | 375/229 |
| 2012/0072784 A1 * | 3/2012 | Li | | G06F 11/267 |
| | | | | 714/704 |
| 2012/0128055 A1 * | 5/2012 | Jiang | | H04L 25/03057 |
| | | | | 375/233 |
| 2012/0133661 A1 * | 5/2012 | Lee | | G09G 3/3688 |
| | | | | 345/558 |
| 2012/0235720 A1 * | 9/2012 | Jiang | | H04L 7/0332 |
| | | | | 327/158 |
| 2013/0249612 A1 * | 9/2013 | Zerbe | | G11C 7/222 |
| | | | | 327/161 |
| 2014/0010276 A1 * | 1/2014 | Hsu | | H04L 25/03949 |
| | | | | 375/233 |
| 2014/0064351 A1 * | 3/2014 | Hidaka | | H04L 25/03057 |
| | | | | 375/232 |
| 2014/0203854 A1 * | 7/2014 | Jung | | H03L 7/0818 |
| | | | | 327/158 |
| 2014/0269881 A1 * | 9/2014 | He | | H04L 25/03878 |
| | | | | 375/231 |
| 2014/0307769 A1 * | 10/2014 | He | | H04L 25/03949 |
| | | | | 375/233 |
| 2016/0116936 A1 * | 4/2016 | Jeong | | G06F 13/4068 |
| | | | | 713/503 |
| 2017/0091516 A1 * | 3/2017 | Xu | | G06K 9/00503 |
| 2017/0132966 A1 * | 5/2017 | Lim | | G09G 5/18 |
| 2017/0170838 A1 * | 6/2017 | Pagnanelli | | H03F 3/2175 |
| 2018/0302264 A1 * | 10/2018 | Liao | | H04L 27/06 |
| 2018/0316356 A1 * | 11/2018 | Moballegh | | H03L 7/087 |
| 2019/0158100 A1 * | 5/2019 | Lim | | H04L 7/044 |
| 2020/0169261 A1 * | 5/2020 | Ryu | | G06F 1/08 |
| 2020/0365199 A1 * | 11/2020 | Seong | | H03L 7/0807 |
| 2021/0067310 A1 * | 3/2021 | Lim | | H03L 7/00 |

(56) References Cited

OTHER PUBLICATIONS

Lee et al., IEEE Journal of Solid-State Circuits, vol. 45 (12) Dec. 2010.
Hartman et al., Continuous-time adaptive- analog coaxial cable equalizer in 0.5 m CMOS, Dept of Electrical and Computer Engineering, University of Toronto.

* cited by examiner

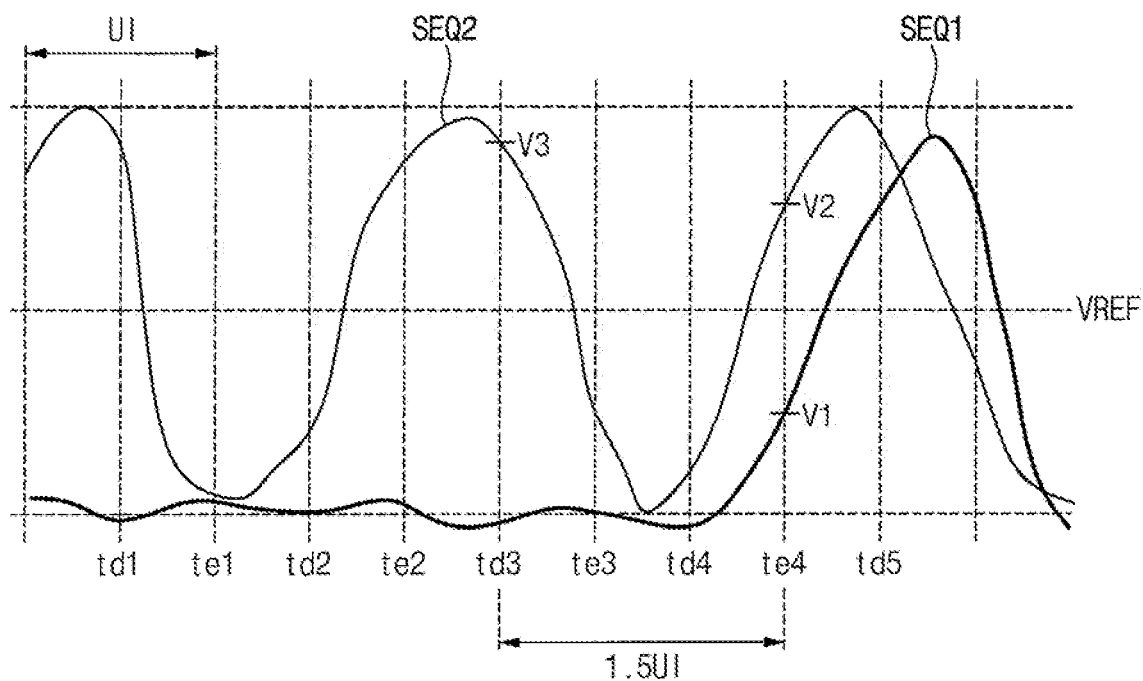

|  | td3 | te4 | AVL |
|---|---|---|---|
| SEQ1 | L | H | −1 |
| SEQ2 | H | L | −1 |

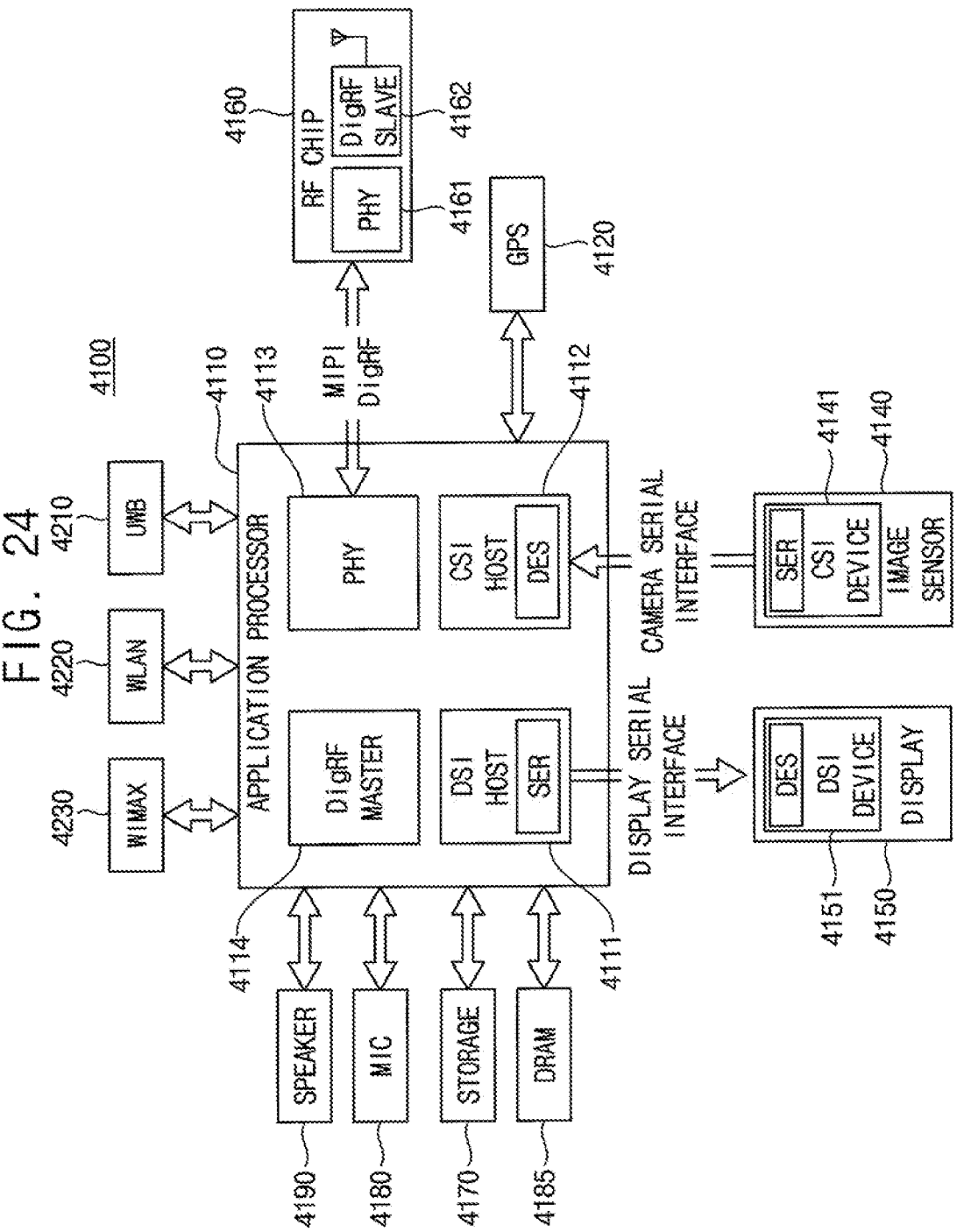

RECEIVER CIRCUIT PERFORMING ADAPTIVE EQUALIZATION AND SYSTEM INCLUDING THE SAME

CROSS-REFERENCE TO RELATED APPLICATION

Korean Patent Application No. 10-2020-0103524, filed on Aug. 18, 2020, in the Korean Intellectual Property Office, and entitled: "Receiver Circuit Performing Adaptive Equalization and System Including the Same," is incorporated by reference herein in its entirety.

BACKGROUND

1. Field

Embodiments relate generally to semiconductor integrated circuits, and more particularly to a receiver circuit performing adaptive equalization and a system including the receiver circuit.

2. Description of the Related Art

An electronic device may perform functions depending on operations of various electronic circuits included in the electronic device. The electronic device may operate either alone or while communicating with another electronic device. As an amount of data exchanged between electronic devices increases, communication circuits capable of transmitting and receiving signals at high speed are being employed. The electronic devices are connected to each other through a communication channel, and the communication channel transfers signals transmitted and received between the electronic devices. The bandwidth of the communication channel may be restricted and the signals on the communication channel may be distorted due to various causes such as skin effect, dielectric loss, etc. Accordingly, quality of the signals transferred with high speed may be degraded.

SUMMARY

Embodiments are directed to a receiver circuit, including: an equalizer configured to generate an equalization signal by equalizing an input data signal transferred through a communication channel based on an equalization coefficient; a clock data recovery circuit configured to generate a data clock signal and an edge clock signal based on the equalization signal, generate a data sample signal including a plurality of data bits by sampling the equalization signal in synchronization with the data clock signal, and generate an edge sample signal including a plurality of edge bits by sampling the equalization signal in synchronization with the edge clock signal; and an equalization control circuit configured to control the equalization coefficient by comparing the plurality of data bits and the plurality of edge bits.

Embodiments are also directed to a system, including: a communication channel; a first device configured to output a transmission data signal to the communication channel based on transmission data; and a second device comprising a receiver circuit connected to the communication channel. The receiver circuit may include: an equalizer configured to generate an equalization signal by equalizing an input data signal transferred through the communication channel based on an equalization coefficient; a clock data recovery circuit configured to generate a data clock signal and an edge clock signal based on the equalization signal, generate a data sample signal including a plurality of data bits by sampling the equalization signal in synchronization with the data clock signal, and generate an edge sample signal including a plurality of edge bits by sampling the equalization signal in synchronization with the edge clock signal; and an equalization control circuit configured to control the equalization coefficient by comparing the plurality of data bits and the plurality of edge bits.

Embodiments are also directed to a receiver circuit, including: an equalizer configured to generate an equalization signal by equalizing an input data signal transferred through a communication channel based on an equalization coefficient; a data sampler configured to generate a data sample signal including a plurality of data bits by sampling the equalization signal in synchronization with a data clock signal; an edge sampler configured to generate an edge sample signal including a plurality of edge bits by sampling the equalization signal in synchronization with an edge clock signal; a clock recovery circuit configured to generate the data clock signal and the edge clock signal based on the data sample signal and the edge sample signal; a state monitor configured to generate a plurality of equalization state values by comparing, bit by bit, the plurality of data bits and the plurality of edge bits; an accumulator configured to generate a state accumulation value by accumulating the equalization state values during an accumulation time interval; and a control logic configured to control the equalization coefficient based on the state accumulation value.

BRIEF DESCRIPTION OF THE DRAWINGS

Features will become apparent to those of skill in the art by describing in detail example embodiments with reference to the attached drawings in which:

FIGS. 8A and 8B are diagrams for describing a relationship between sample bits in an under-equalized state.

FIG. 24 is a block diagram illustrating an example embodiment of an interface employable in a computing system according to an example embodiment.

DETAILED DESCRIPTION

Figure 1:
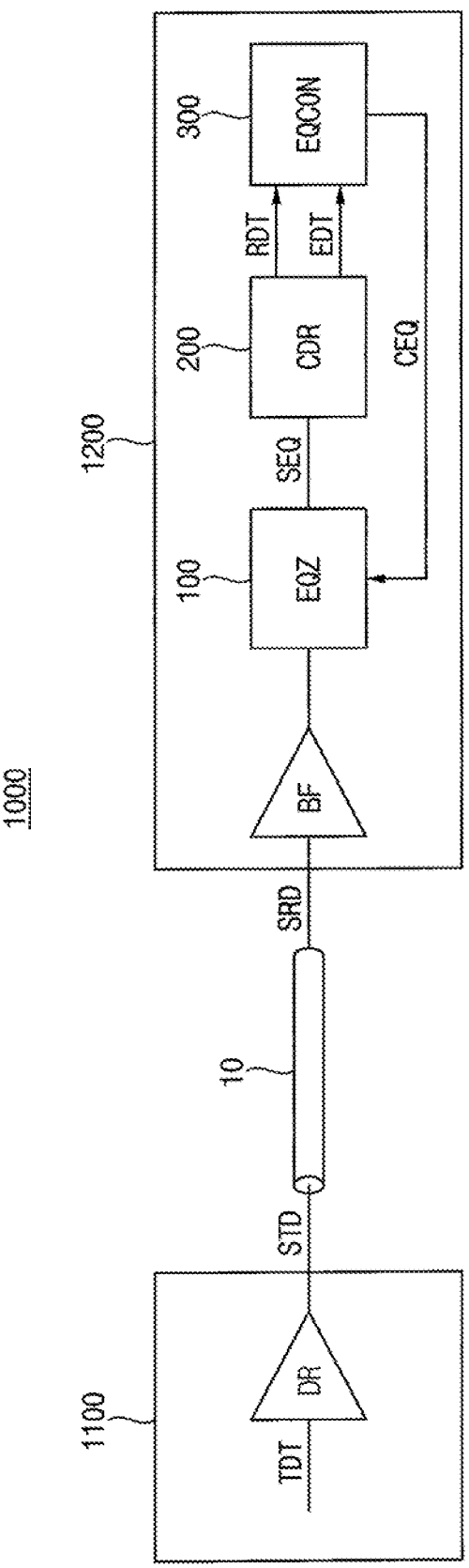
FIG. 1 is a block diagram illustrating a system including a receiver circuit according to an example embodiment.

FIG. 1 is a block diagram illustrating a system including a receiver circuit according to an example embodiment.

Referring to FIG. 1, a system 1000 includes a transmitter circuit 1100, a receiver circuit 1200, and a communication channel 10 connecting the transmitter circuit 1100 and the receiver circuit 1200.

The transmitter circuit 1100 may include a transmission driver DR that outputs a transmission data signal STD to the communication channel 10 based on transmission data TDT.

The receiver circuit 1200 may include a reception buffer BF, an equalizer EQZ 100, a clock data recovery circuit CDR 200, and an equalization control circuit EQCON 300.

The reception buffer BF may buffer and output an input data signal SRD transferred through the communication channel 10. The equalizer 100 may generate an equalization signal SEQ by equalizing the input data signal SRD based on an equalization coefficient CEQ. According to an example embodiment, the reception buffer BF may be omitted and the equalizer 100 may receive the input data signal SRD directly from the communication channel 10. An example embodiment of the equalizer 100 will be described below with reference to FIGS. 5 and 6.

Figure 2:
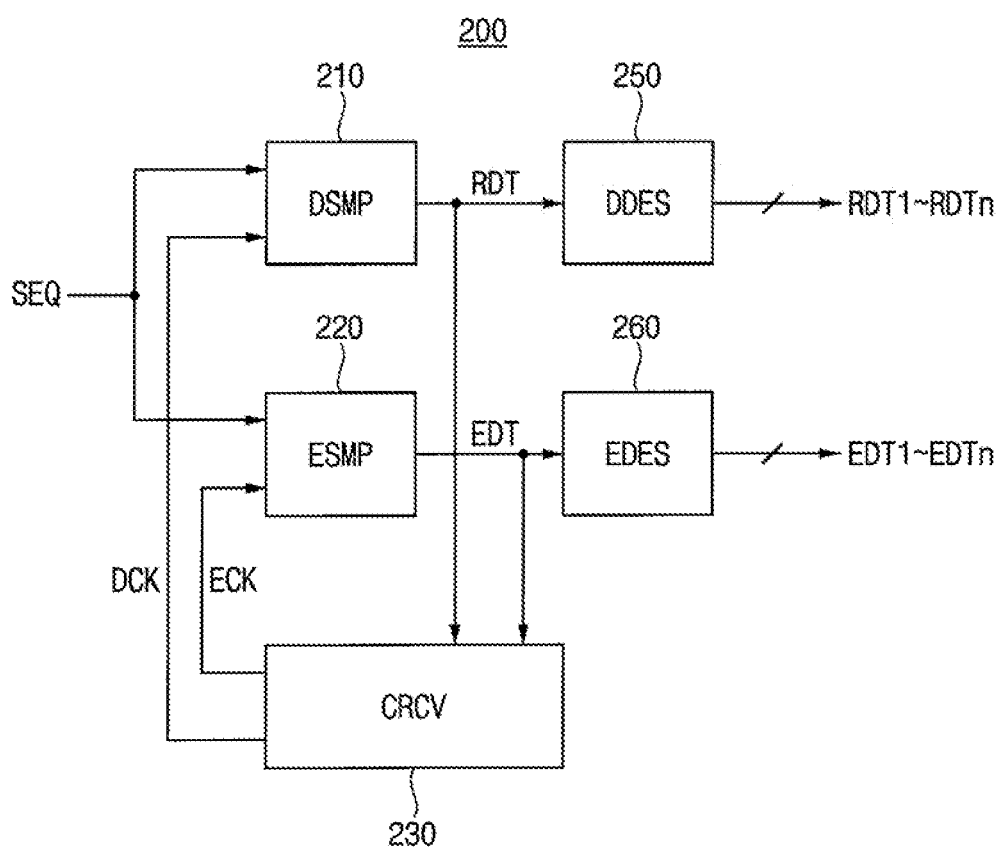
FIG. 2 is a block diagram illustrating an example embodiment of a clock data recovery circuit included in a receiver circuit according to an example embodiment.

Using the equalization signal SEQ, the clock data recovery circuit 200 may internally generate a data clock signal (DCK, see FIG. 2) and an edge clock signal (ECK, see FIG. 2). The clock data recovery circuit 200 may generate a data sample signal RDT including a plurality of data bits by sampling the equalization signal SEQ in synchronization with the data clock signal DCK. In addition, the clock data recovery circuit 200 may generate an edge sample signal EDT including a plurality of edge bits by sampling the equalization signal SEQ in synchronization with the edge clock signal ECK. An example embodiment of the clock data recovery circuit 200 will be described below with reference to FIG. 2.

The equalization control circuit 300 may control the equalization coefficient CEQ by comparing the plurality of data bits in the data sample signal RDT and the plurality of edge bits in the edge sample signal EDT.

As will be described below with reference to FIGS. 3 through 18, the equalization control circuit 300 may generate a plurality of equalization state values by comparing, bit by bit, the plurality of data bits and the plurality of edge bits, and may generate a state accumulation value by accumulating the equalization state values during an accumulation time interval.

The receiver circuit 1200 according to an example embodiment may reduce jitters of the equalization signal SEQ with high accuracy by performing adaptive equalization digitally based on the data bits and the edge bits, and thus performance of the receiver circuit 1200 and the system 1000 including the receiver circuit 1200 may be enhanced.

FIG. 2 is a block diagram illustrating an example embodiment of a clock data recovery circuit included in a receiver circuit according to an example embodiment.

Referring to FIG. 2, the clock data recovery circuit 200 may include a data sampler DSMP 210, an edge sampler ESMP 220, a clock recovery circuit CRCV 230, a first deserializer DDES 250, and a second deserializer EDES 260. According to an example embodiment, the first deserializer 250 and the second deserializer 260 may be omitted or disposed outside the receiver circuit 1200. In an example embodiment, the first deserializer 250 and the second deserializer 260 may be included in the data sampler 210 and the edge sampler 220, respectively.

The data sampler 210 may generate the data sample signal RDT including the plurality of data bits by sampling the equalization signal SEQ in synchronization with the data clock signal DCK. The edge sampler 220 may generate the edge sample signal EDT including the plurality of edge bits by sampling the equalization signal SEQ in synchronization with the edge clock signal ECK.

The clock recovery circuit 230 may generate the data clock signal DCK and the edge clock signal ECK based on the data sample signal RDT and the edge sample signal EDT. The data clock signal DCK and the edge clock signal ECK may have a phase difference of about 180 degrees.

The first deserializer 250 may generate a plurality of parallel data sample signals RDT1~RDTn by deserializing the data sample signal RDT. The second deserializer 260 may generate a plurality of parallel edge sample signals EDT1~EDTn by deserializing the edge sample signal EDT.

The clock recovery circuit 230 may include a feedback loop such as a phase-locked loop (PLL), a delay-locked loop (DLL), etc., to search and fix a phase and a frequency of an output clock signal. The data sampler 210, the edge sampler 220, the first deserializer 250, and the second deserializer 260 may include a flip-flop to latch an input signal in synchronization with a clock signal, a clock divider, a multiplexer, etc.

In an example embodiment, the equalization control circuit 300 may control the equalization coefficient CEQ based on the data sample signal RDT and the edge sample signal EDT. In an example embodiment, the equalization control circuit 300 may control the equalization coefficient CEQ based on at least one of the parallel data sample signals RDT1~RDTn and at least one of the parallel edge sample signals EDT1~EDTn.

Figure 3:
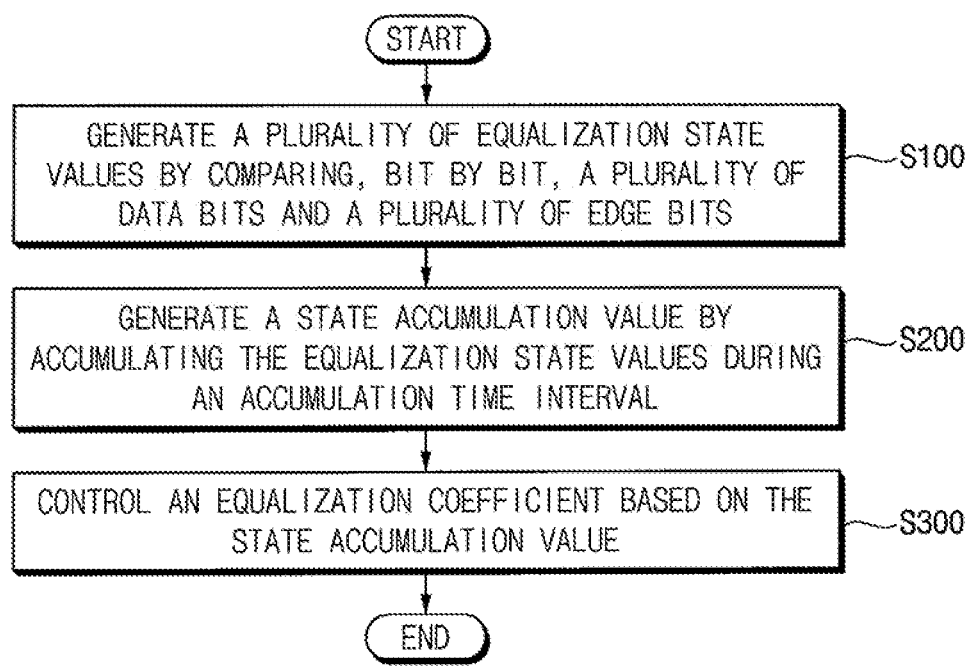
FIG. 3 is a flow chart illustrating an equalization control method according to an example embodiment.
Figure 4:
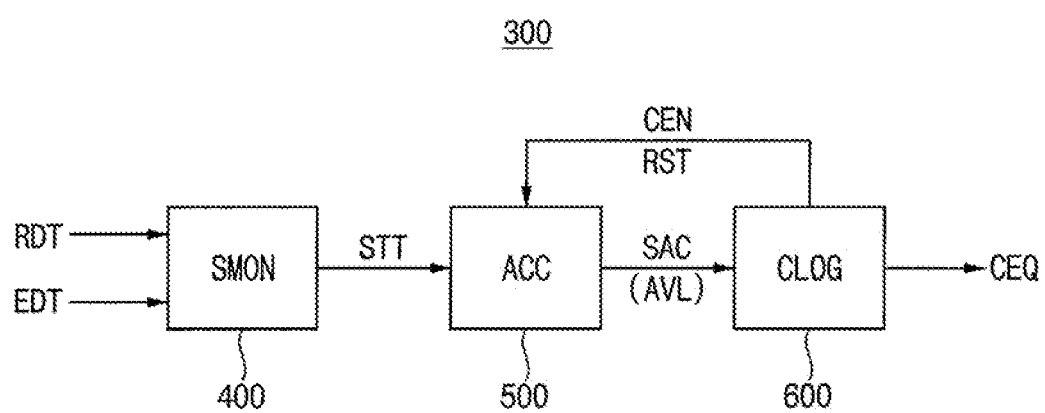
FIG. 4 is a block diagram illustrating an example embodiment of an equalization control circuit included in a receiver circuit according to an example embodiment.

FIG. 3 is a flow chart illustrating an equalization control method according to an example embodiment, and FIG. 4 is a block diagram illustrating an example embodiment of an equalization control circuit included in a receiver circuit according to an example embodiment.

Referring to FIGS. 3 and 4, the equalization control circuit 300 may include a state monitor SMON 400, an accumulator ACC 500, and a control logic CLOG 600.

The state monitor 400 may generate a plurality of equalization state values by comparing, bit by bit, the plurality of data bits included in the data sample signal RDT and the plurality of edge bits included in the edge sample signal EDT (S100). The plurality of equalization state values may be included in a state monitoring signal STT output from the state monitor 400. The state monitor 400 may include at least one XOR gate configured to perform an XOR logic operation, bit by bit, on the plurality of data bits and the plurality of edge bits to output the plurality of equalization state values, as will be described below with reference to FIGS. 11 and 16.

The accumulator 500 may generate a state accumulation value AVL by accumulating the equalization state values during an accumulation time interval (S200), and the control logic 600 may control the equalization coefficient CEQ based on the state accumulation value AVL (S300). The state accumulation value AVL may be included in an accumulator output signal SAC that is provided from the accumulator 500 to the control logic 600. The control logic 600 may generate a reset signal RST and an accumulation enable signal CEN to be provided to the accumulator 500. The accumulator 500 may be initialized in response to the reset signal RST, and the accumulation time interval may be defined by an activation time interval of the accumulation enable signal CEN as will be described below with reference to FIG. 13. The accumulator output signal SAC may maintain the state accumulation value AVL after the accumulation time interval until the accumulator 500 is reset again in response to the reset signal RST.

Figure 5:
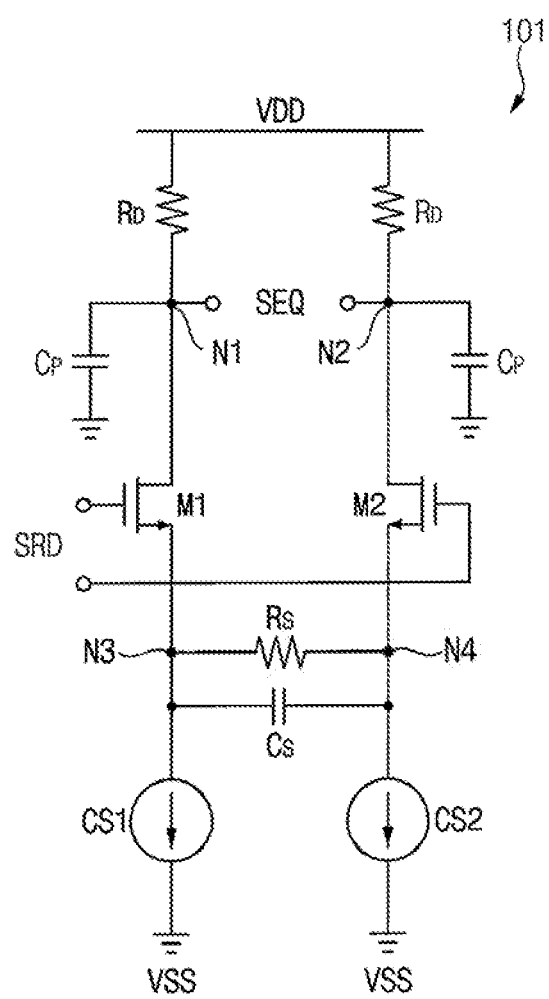
FIG. 5 is a circuit diagram illustrating an example embodiment of an equalizer included in a receiver circuit according to an example embodiment.
Figure 6:
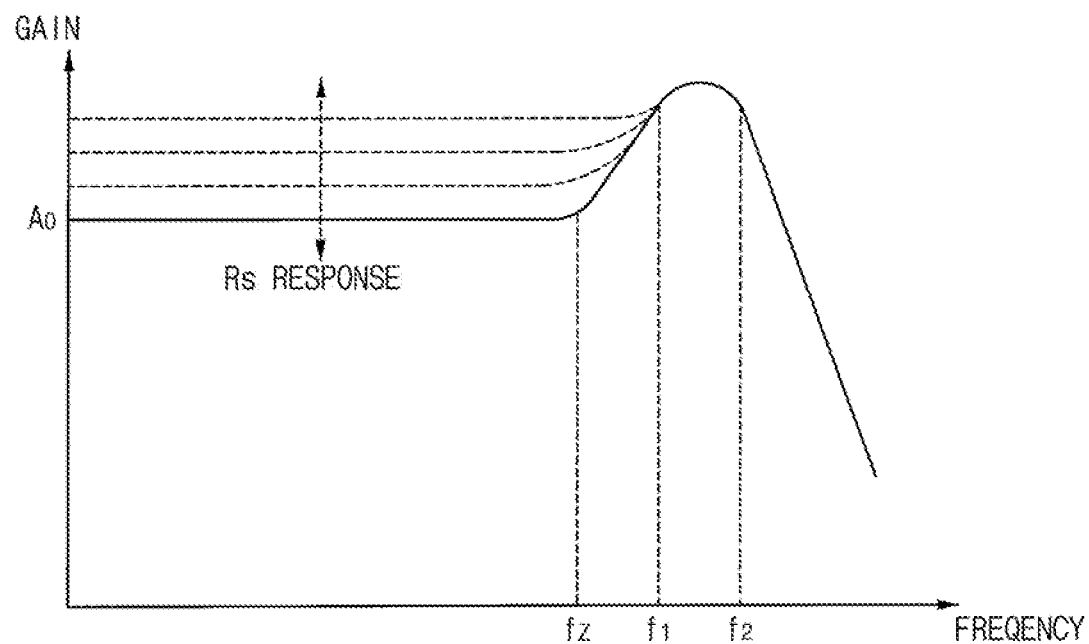
FIG. 6 is a diagram illustrating a frequency response according to an equalization state of an equalizer.

FIG. 5 is a circuit diagram illustrating an example embodiment of an equalizer included in a receiver circuit according to an example embodiment, and FIG. 6 is a diagram illustrating a frequency response according to an equalization state of an equalizer.

FIG. 5 conceptually illustrates circuitry of an equalizer 101 according to an example embodiment. The equalizer 101 may equalize the input data signal SRD and generate the equalization signal SEQ.

The equalizer 101 may be implemented with at least one frequency-dependent source-degenerating amplifier as illustrated in FIG. 5. The structure of the equalizer 101 may be well suited for one dimensional control of the equalization strength.

Referring to FIG. 5, the equalizer 101 may include resistors $R_D$, a pair of transistors M1 and M2, a variable resistor array Rs, a variable capacitor array Cs, and current sources CS1 and CS2. The resistors $R_D$ may be connected between a power supply voltage VDD and nodes N1 and N2. The current sources CS1 and CS2 may be connected between nodes N3 and N4 and a ground voltage VSS. The pair of transistors M1 and M2 may be connected to the power supply voltage VDD through resistors $R_D$, and to the ground voltage VSS through current sources CS1 and CS2, respectively. The transistors M1 and M2 may be coupled through the variable resistor array Rs and the variable capacitor array Cs, which are coupled in parallel to each other between the nodes N3 and N4.

In an example embodiment, the variable resistor array Rs may include a plurality of resistors that may be coupled to each other in parallel by switches, respectively, such that each switch is coupled in series to each resistor. The opening and closing of the switches may be controlled by a digital value of the equalization coefficient CEQ.

In an example embodiment, the variable capacitor array Cs may include a plurality of capacitors that may be coupled in parallel by switches, respectively, such that each capacitor is coupled in series to each capacitor. The opening and closing of the switches may be controlled by the digital value of the equalization coefficient CEQ.

The resistance value of the resistors $R_D$ and the variable resistor array Rs, and the capacitance of the variable capacitor array Cs may determine a DC gain, pole locations, and a zero location of the equalizer 101.

FIG. 6 illustrates how the gain of the equalizer 101 changes adaptively depending upon an equalization state that may be determined according to an example embodiment. In FIG. 6, the horizontal axis indicates a frequency of the input data signal SRD, and the vertical axis indicates the DC gain of the equalizer 101.

Referring to FIG. 6, the equalizer 101 may have characteristics defined by the following equations:

$$A_0 = R_D/Rs$$

$$fz = 1/(Cs \times Rs)$$

$$f1 = gm/Cs$$

$$f2 = 1/(Cs \times R_D)$$

In the above equations, $A_0$ is the DC gain of the equalizer 101, Fz is the zero location of the equalizer 101, f1 and f2 are the pole locations of the equalizer 101, and gm is the transconductance of the transistors M1 and M2. Additionally, $R_D$ is the resistance of the resistors $R_D$, Rs is the resistance of the variable resistor array Rs, and Cs is the capacitance of the variable capacitor array Cs.

The zero location fz determines the frequency band to be boosted by the equalizer 101, while the DC gain $A_0$ controls the equalization strength. Once the data rate of the input data signal SRD is determined, the zero location fz may be set via manual control or automatic band selection circuitry. Then, the equalization control circuit 300 in FIG. 1 may adjust the equalization coefficient CEQ to change the DC gain $A_0$ and obtain the maximum eye opening in the non-return to zero (NRZ) data pattern.

In general, since the DC gain $A_0$ is dependent upon the resistances $R_D$ and Rs, the DC gain $A_0$ of the equalizer 101 may be controlled by adjusting the value of the resistance Rs using the equalization coefficient CEQ. In the present example embodiment, the switches in the variable resistor array Rs are configured such that an increase in the equalization coefficient CEQ results in an increase in the resistance Rs and thus a decrease in the DC gain $A_0$. The decrease in the DC gain $A_0$ effectively results in a relative increase in the high frequency gain for the high frequency pattern. Thus, an increase in the equalization coefficient CEQ results in a relative increase in the high frequency gain for the high frequency pattern relative to the low frequency gain for the low frequency pattern. On the other hand, a decrease in the equalization coefficient CEQ results in a decrease in the resistance Rs and a decrease in the DC gain $A_0$, and thus a relative decrease in the high frequency gain for the high frequency pattern relative to the low frequency gain for the low frequency pattern.

Figure 7:
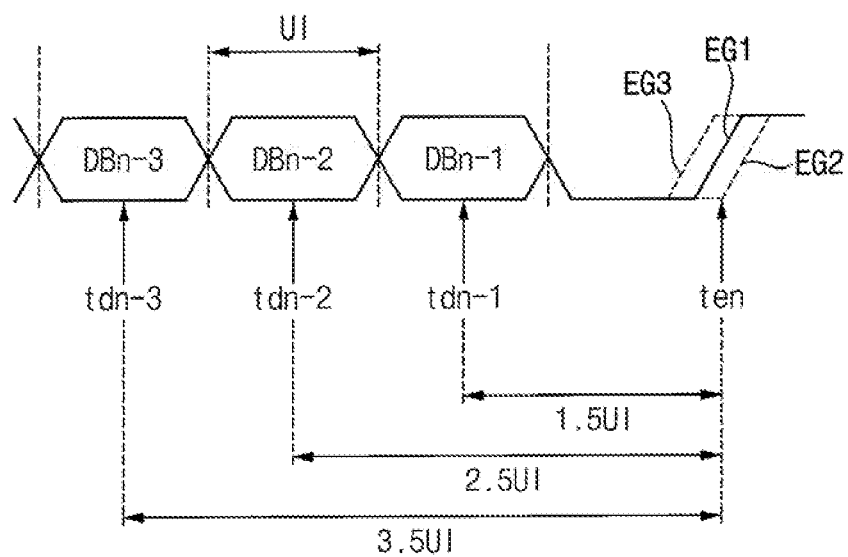
FIG. 7 is a diagram for describing an inter-symbol interference (ISI) of a signal transferred through a communication channel.

FIG. 7 is a diagram for describing an inter-symbol interference (ISI) of a signal transferred through a communication channel.

In FIG. 7, a unit interval UI indicates a time interval between two adjacent data bits of the input data signal SRD. The unit interval UI may correspond to a cyclic period of the data clock signal DCK and the edge clock signal ECK. The unit interval UI may be maintained after the data clock signal DCK and the edge clock signal ECK are fixed by the clock recovery circuit 230 in FIG. 2.

In FIG. 7, tdn-3, tdn-2, and tdn-1 indicate data sampling time points, and ten indicates an edge sampling time point. Thus, the data sampling time points tdn-3, tdn-2, and tdn-1 correspond to edges of the data clock signal DCK, and the edge sampling time point ten corresponds to an edge of the edge clock signal ECK.

The levels of data symbols or data bits DBn-3, DBn-2, and DBn-1, which precede the edge sampling time point ten by 3.5UI, 2.5UI, and 1.5UI, may affect an edge EG1 at the edge sampling time point ten by the inter-symbol interference (ISI).

In an under-equalized state of the equalizer, the original edge EG1 may move to a delayed edge EG2 when the preceding data bit is 0, and the original edge EG1 may move to a preceding edge EG3 when the preceding data bit is 1.

In contrast, in an over-equalized state of the equalizer, the original edge EG1 may move to the delayed edge EG2 when the preceding data bit is 1, and the original edge EG1 may move to the preceding edge EG3 when the preceding data bit is 0.

Among the preceding data bits DBn-3, DBn-2, and DBn-1, the data bit DBn-1 preceding by 1.5UI causes the most significant ISI to the original edge EG1 at the edge sampling time point ten. According to an example embodiment, the equalization state of the equalizer or the equalization signal SEQ may be determined by comparing the edge bit and the data bit that most greatly affects the edge bit. Thus, the equalization state of the equalizer may be determined by comparing each data bit with each edge bit that is sampled after one and a half of the unit interval (i.e., 1.5UI) from when each data bit is sampled.

Figures 9A, 9B:
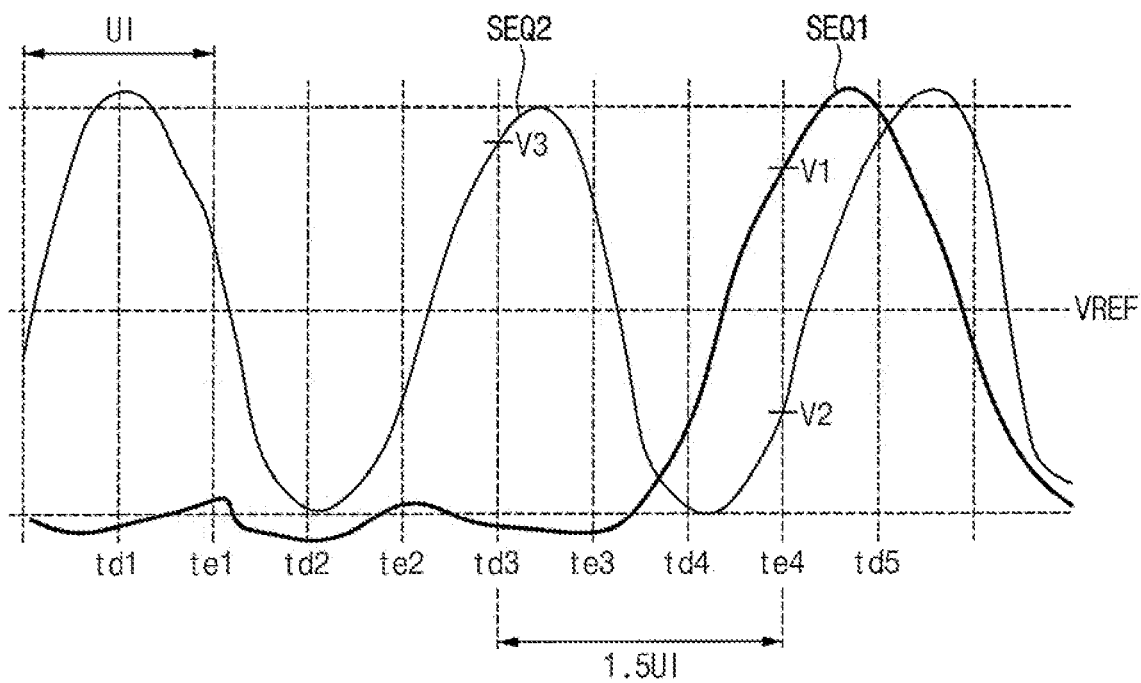
FIGS. 9A and 9B are diagrams for describing a relationship between sample bits in an over-equalized state.

FIGS. 8A and 8B are diagrams for describing a relationship between sample bits in an under-equalized state. FIGS. 9A and 9B are diagrams for describing a relationship between sample bits in an over-equalized state. The under-equalized and over-equalized states are described in sequence below.

Under-Equalized State

FIG. 8A illustrates an equalization signal SEQ1 of a low frequency pattern and an equalization signal SEQ2 of a high frequency pattern in the under-equalized state. In FIG. 8A, td1 to td5 denote data sampling times, and te1 to te4 denote edge sampling times.

The following is described with reference to FIGS. 7, 8A, and 8B. Note that, in FIG. 8A, data sampling point td3 precedes edge sampling point te4 by 1.5UI. Also note that, as described above in connection with FIG. 7, for the under-equalized state, the original edge EG1 may be delayed to the delayed edge EG2 when the preceding data bit is 0, and the original edge EG1 may be advanced to the preceding edge EG3 when the preceding data bit is 1.

Referring to FIG. 8A, in the under-equalized state, in the equalization signal SEQ1 of the low-frequency pattern, the edge corresponding to the edge sampling point te4 has a data bit value of 0 (logic level low (L)) at the data sampling point td3, so it is delayed.

Referring to FIG. 8A, in the under-equalized date, in the equalization signal SEQ2 of the high-frequency pattern, the edge corresponding to the edge sampling point te4 has a data bit value of 1 (logic level high (H)) at the data sampling point td3, so it is advanced.

FIG. 8B illustrates the result of the ISI that is described above in connection with FIG. 8A.

FIG. 8B shows sampling results for FIG. 8A, which are obtained by comparing a reference voltage VREF with a signal level V3 (at the data sampling time point td3) and signal levels V1 and V2 (at the edge sampling time point te4).

As illustrated in FIG. 8B, the data bit at the data sampling time point td3 and the edge bit at the edge sampling time point te4 may have the same logic levels, i.e., the same bit values in the under-equalized state, regardless of the equalization signal SEQ1 of the low frequency pattern and the equalization signal SEQ2 of the high frequency pattern. In this case, the state accumulation value AVL may be increased (+1) by one.

Over-Equalized State

FIG. 9A illustrates the equalization signal SEQ1 of the low frequency pattern and the equalization signal SEQ2 of the high frequency pattern in the over-equalized state.

The following is described with reference to FIGS. 7, 9A, and 9B. Note that, in FIG. 9A, the data sampling point td3 precedes the edge sampling point te4 by 1.5UI. Also note that, as described above in connection with FIG. 7, for the over-equalized state, the original edge EG1 may be delayed the delayed edge EG2 when the preceding data bit is 1, and the original edge EG1 may be advanced to the preceding edge EG3 when the preceding data bit is 0.

Referring to FIG. 9A, in the over-equalized state, in the equalization signal SEQ1 of the low frequency pattern, the edge corresponding to the sampling time point te4 has a data bit value of 0 (logic level low (L), so it is advanced.

Referring to FIG. 9A, in the over-equalized state, in the equalization signal SEQ2 of the high frequency pattern, the edge corresponding to the sampling time point te4 has a data bit value of 1 (logic level high (H), so it is delayed.

FIG. 9B illustrates the result of the ISI that is described above in connection with FIG. 9A.

FIG. 9B shows sampling results for FIG. 9A, which are obtained by comparing the voltage reference VREF with the signal level V3 (at the data sampling time point td3) and the signal levels V1 and V2 (at the edge sampling time point te4).

As illustrated in FIG. 9B, the data bit at the data sampling time point td3 and the edge bit at the edge sampling time point te4 may have the different logic levels, i.e., the different bit values in the over-equalized state, regardless of the equalization signal SEQ1 of the low frequency pattern and the equalization signal SEQ2 of the high frequency pattern. In this case, the state accumulation value AVL may be decreased (−1) by one.

Well-Equalized State

Figure 10:
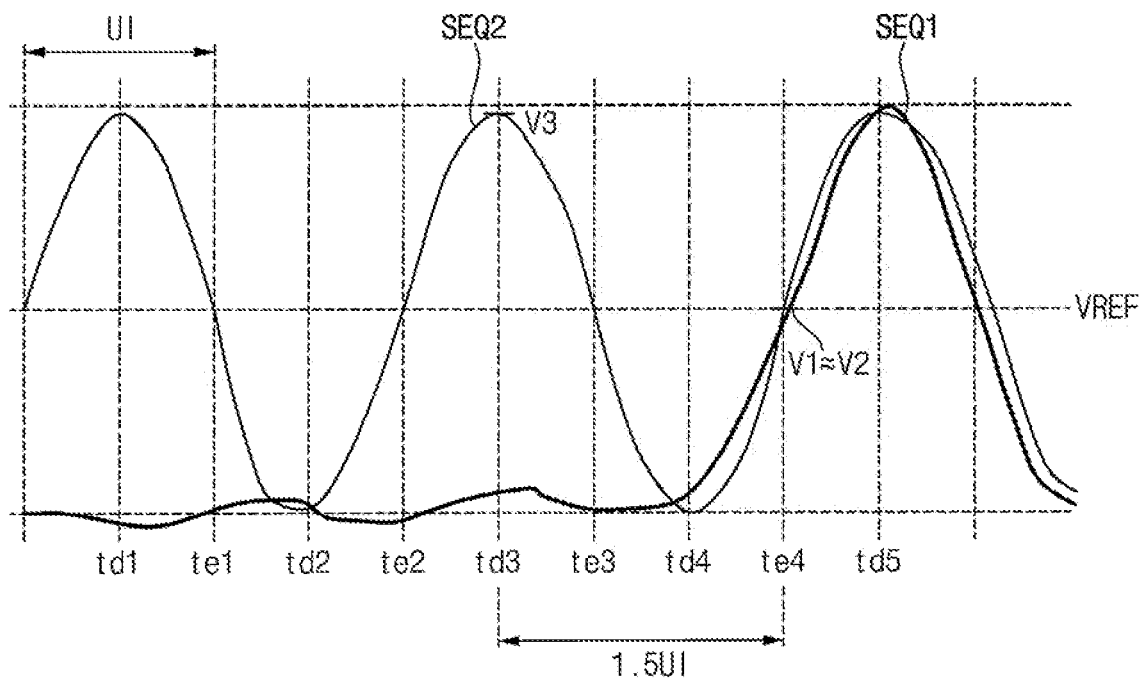
FIG. 10 is a timing diagram illustrating an equalization signal in a well-equalized state.

FIG. 10 is a timing diagram illustrating an equalization signal in a well-equalized state.

As illustrated in FIG. 10, in a well-equalized state, the data sampling time points td1~td5 may locate very near to the centers of the respective data bits, and the edge sampling time points te1~te4 may locate very near to the edges of the data bits. Further, the signal levels of the equalization signals SEQ1 and SEQ2 at the edge sampling time points te1~te4 may be substantially the same as the reference voltage VREF, and thus the data bit at the data sampling time point td3 and the edge bit at the edge sampling time point te4 may have the same bit values as the under-equalized state or the different bit values as the over-equalized state. Thus, the probability to be determined as the under-equalized state and the probability to be determined as the over-equalized state may be substantially the same in the well-equalized state.

According to an example embodiment, an equalization state value may be generated by comparing a data bit and an edge bit corresponding to the data bit, and the equalization state may be determined accurately by accumulating the equalization state values during an accumulation time interval.

Figure 11:
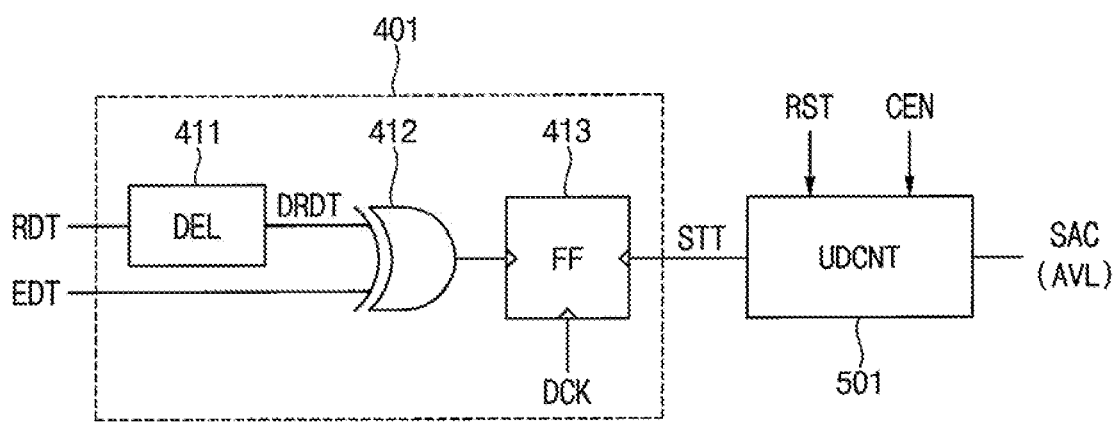
FIG. 11 is a diagram illustrating an example embodiment of an equalization control circuit included in a receiver circuit according to an example embodiment.

FIG. 11 is a diagram illustrating an example embodiment of an equalization control circuit included in a receiver circuit according to an example embodiment.

Referring to FIG. 11, an equalization control circuit 301 may include a state monitor 401 and an accumulator 501. The control logic as described with reference to FIG. 4 is omitted in FIG. 11, and descriptions repeated with FIG. 4 may be omitted.

The state monitor 401 may generate the state monitoring signal STT including the plurality of equalization state values by comparing, bit by bit, the plurality of data bits included in the data sample signal RDT and the plurality of edge bits included in the edge sample signal EDT.

The accumulator 501 may generate the state accumulation value AVL by accumulating the equalization state values during an accumulation time interval. The state accumulation value AVL may be included in an accumulator output signal SAC that is provided from the accumulator 501 to the control logic. The accumulator 501 may be initialized in response to the reset signal RST, and the accumulation time interval may be defined by the activation time interval of the accumulation enable signal CEN. The accumulator output signal SAC may maintain the state accumulation value AVL after the accumulation time interval until the accumulator 501 is reset again in response to the reset signal RST.

The state monitor 401 may include a delay circuit DEL 411, an XOR (exclusive-OR) gate 412, and a flip-flop FF 413.

The delay circuit 411 may generate a delayed data sample signal DRDT by delaying the data sample signal RDT. In an example embodiment, the delay circuit 411 may delay the data sample signal RDT by the 1.5UI as described above with reference to FIGS. 8A through 10 to generate the delayed data sample signal DRDT.

The XOR gate 412 may perform an XOR logic operation on the delayed data sample signal DRDT and the edge sample signal EDT. The XOR gate 412 may output the value of 1 (that is, the logic high level H) when the two input bit values are equal and output the value of 0 (that is, the logic low level L) when the two input bit values are different.

The flip-flop 413 may generate the state monitoring signal STT including the plurality of equalization state values by latching the output of the XOR gate 412. In an example embodiment, the flip-flop 413 may perform the latching operation in synchronization with the data clock signal DCK.

The accumulator 501 may include a counter, e.g., an up-down counter UDCNT configured to generate the state accumulation value AVL based on the state monitoring signal STT. The up-down counter UDCNT may increase a stored value in the up-down counter UDCNT when each equalization state value in the state monitoring signal STT is 1 and decrease the stored value when each equalization state value is 0.

Figure 12:
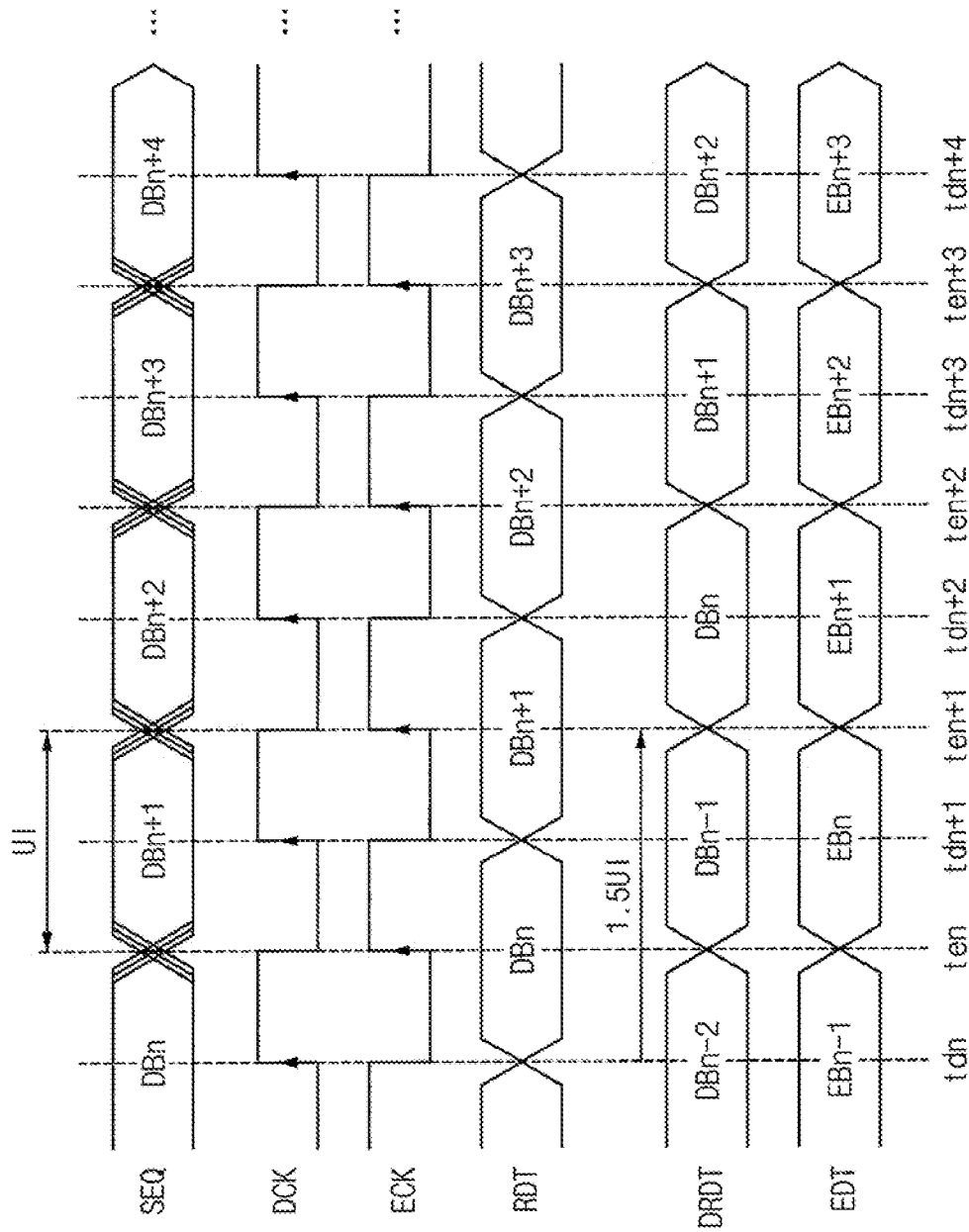
FIGS. 12 and 13 are timing diagrams illustrating operations of the equalization control circuit of FIG. 11.
Figure 13:
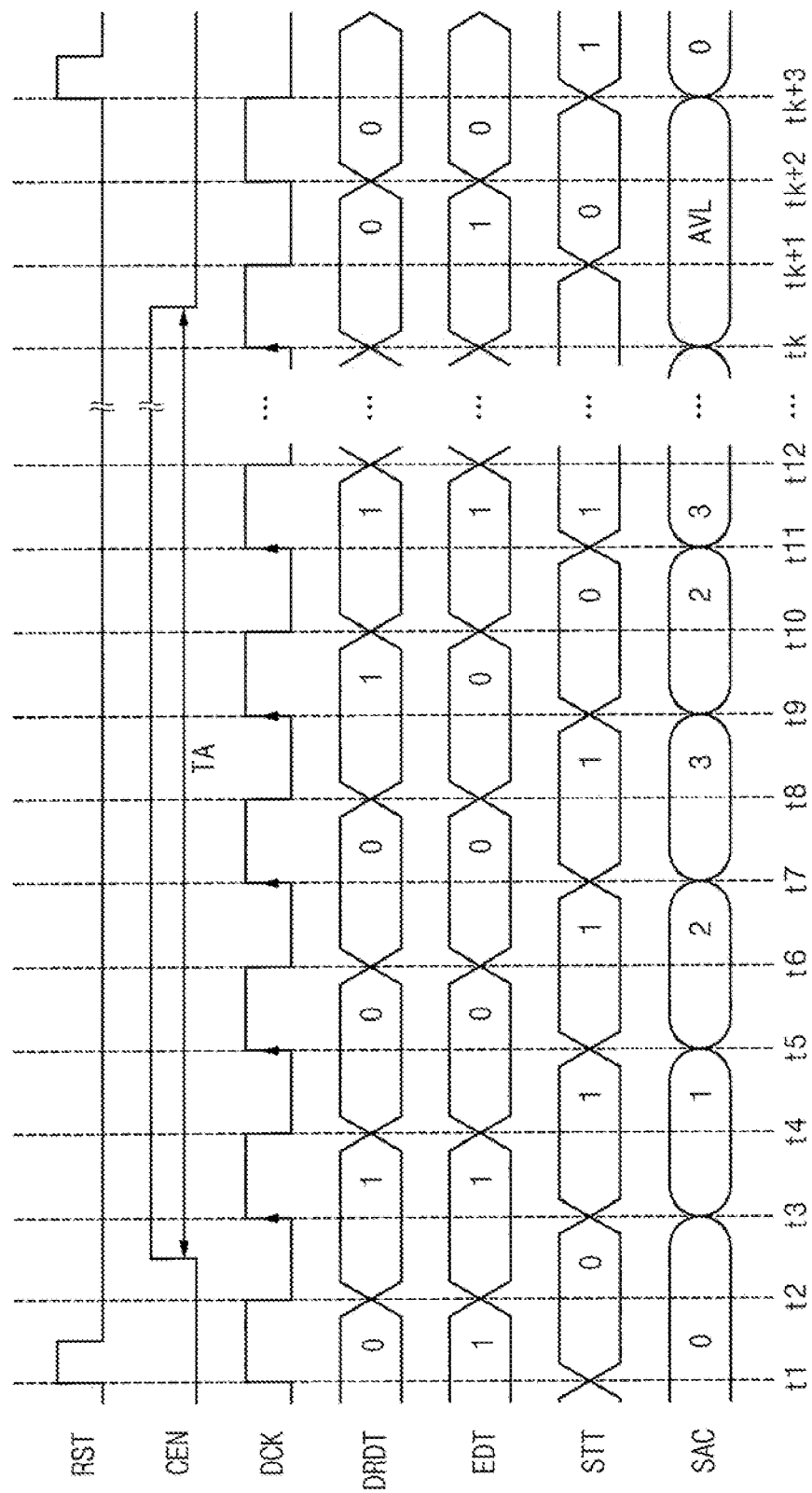

FIGS. 12 and 13 are timing diagrams illustrating operations of the equalization control circuit of FIG. 11. In FIG. 12, tdi (i is a natural number) indicates each data sampling time point and tei indicates each edge sampling point. In FIG. 13, ti indicates each data sampling time point or each edge sampling point.

In the present example embodiment, the data sampling time points may correspond to the rising edges of the data clock signal DCK, and the edge sampling time points may correspond to the rising edges of the edge clock signal ECK.

Referring to FIGS. 2, 11, and 12, the data sampler 210 may generate the data sample signal RDT including the plurality of data bits DBn-2~DBn+2 by sampling the equalization signal SEQ in synchronization with the data clock signal DCK. The edge sampler 220 may generate the edge sample signal EDT including the plurality of edge bits EBn-1~EBn+3 by sampling the equalization signal SEQ in synchronization with the edge clock signal ECK. As illustrated in FIG. 12, the data clock signal DCK and the edge clock signal ECK may have a phase difference of about 180 degrees.

The delay circuit 411 may generate the delayed data sample signal DRDT by delaying the data sample signal RDT by the 1.5UI. As such, the delayed data sample signal DRDT and the edge sample signal EDT may be synchronized such that each edge bit and each data bit preceding by the 1.5UI may be aligned to the rising edges of the data clock signal DCK.

FIG. 13 illustrates an example of the bit values of the delayed data sample signal DRDT and the edge sample signal EDT.

Referring to FIGS. 11 and 13, the XOR gate 412 may perform the XOR logic operation on the delayed data sample signal DRDT and the edge sample signal EDT. The XOR gate 412 may output the value of 1 when the two corresponding bit values of the delayed data sample signal DRDT and the edge sample signal EDT are equal, and output the value of 0 when the two corresponding bit values are different.

The flip-flop 413 may generate the state monitoring signal STT including the plurality of equalization state values by latching an output of the XOR gate in synchronization with the data clock signal DCK.

As a result, the state monitor 401 of the equalization control circuit 301 may generate each equalization state value of 1 when each data bit and each edge bit that are compared have equal values, and generate each equalization state value of 0 when each data bit and each edge bit that are compared have different values.

The up-down counter UDCNT of the accumulator 501 may reset the stored value in the up-down counter UDCNT to the value of 0 in response to the reset signal RST. The activation time interval TA of the accumulation enable signal CEN may correspond to the above-described accumulation time interval. The up-down counter UDCNT may generate the state accumulation value AVL by accumulating the equalization state values included in the state monitoring signal STT during the accumulation time interval TA. The accumulator output signal SAC may maintain the state accumulation value AVL after the accumulation time interval TA until the accumulator 501 is reset again in response to the reset signal RST.

As a result, the equalization control circuit 301 may increase the state accumulation value AVL by one when each data bit and each edge bit that are compared have equal values and decrease the state accumulation AVL by one value when each data bit and each edge bit that are compared have different values.

Figure 14:
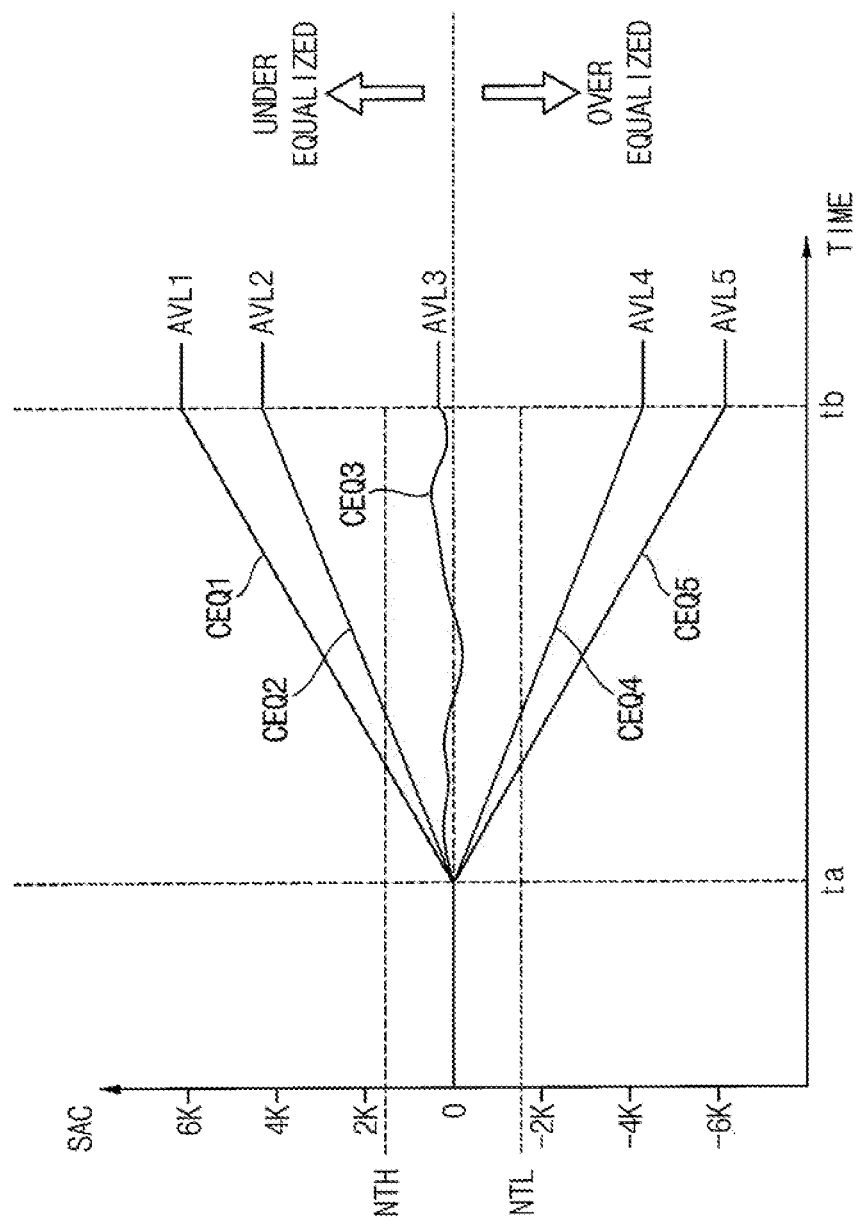
FIG. 14 is a diagram illustrating an example of an equalization coefficient and a state accumulation value.

FIG. 14 is a diagram illustrating an example of an equalization coefficient and a state accumulation value.

In FIG. 14, the horizontal axis indicates a time and the vertical axis indicates a value of the accumulator output signal SAC. Also, to indicates an accumulation start time point, i.e., the activation time point of the accumulation enable signal CEN, and tb indicates an accumulation end time point, i.e., the deactivation time point of the accumulation enable signal CEN.

In an example embodiment, as illustrated in FIG. 14, a first equalization coefficient value CEQ1 and a second equalization coefficient value CEQ2 of the equalization coefficient CEQ may correspond to the under-equalized state, a third equalization coefficient value CEQ3 of the equalization coefficient CEQ may correspond to the well-equalized state, and a fourth equalization coefficient value CEQ4 and a fifth equalization coefficient value CEQ5 of the equalization coefficient CEQ may correspond to the over-equalized state.

The control logic 600 of the equalization control circuit 300 in FIG. 4 may determine that the equalizer or the equalization signal SEQ is in the under-equalized state when the state accumulation value AVL is greater than a first reference value NTH, and may increase the equalization coefficient CEQ to increase equalization strength of the equalizer. In an example embodiment, the control logic 600 may increase the equalization coefficient CEQ in case of the under-equalized state when a first state accumulation value AVL1 corresponding to the first equalization coefficient value CEQ1 and a second state accumulation value AVL2 corresponding to the second equalization coefficient value CEQ2 are greater than the first reference value NTH.

In contrast, the control logic 600 may determine that the equalizer or the equalization signal SEQ is in the over-equalized state when the state accumulation value AVL is smaller than a second reference value NTL that is lower than the first reference value NTH, and may decrease the equalization coefficient CEQ to decrease equalization strength of the equalizer. In an example embodiment, the control logic 600 may decrease the equalization coefficient CEQ in case of the over-equalized state when a fourth state accumulation value AVL4 corresponding to the fourth equalization coefficient value CEQ4 and a fifth state accumulation value AVL5 corresponding to the second equalization coefficient value CEQ5 are smaller than the second reference value NTL.

The control logic 600 may maintain the equalization coefficient CEQ without adjusting when the state accumulation value AVL is between the first reference value NTH and the second reference value NTL. In an example embodiment, the control logic 600 may maintain the equalization coefficient CEQ in case of the well-equalized state when a third state accumulation value AVL3 corresponding to the fourth equalization coefficient value CEQ3 is between the first reference value NTH and the second reference value NTL.

Figure 15A:
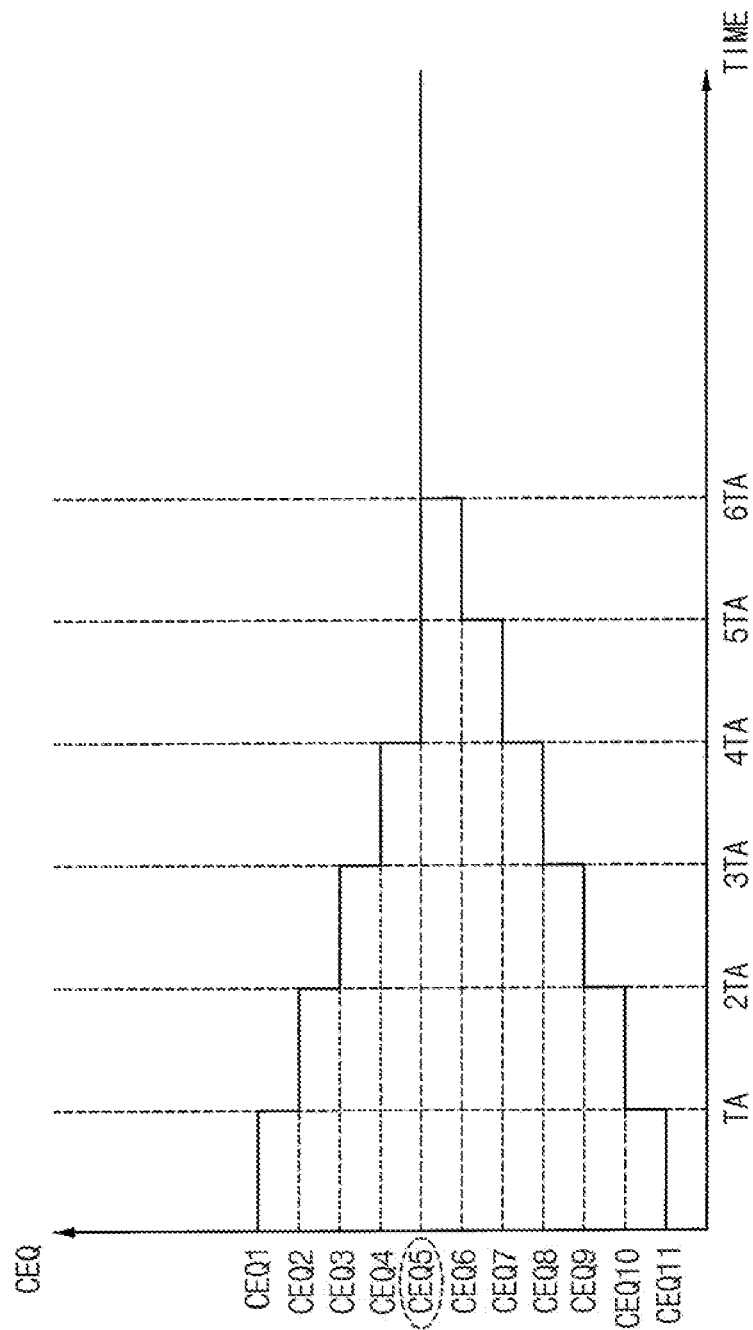
FIGS. 15A and 15B are diagrams illustrating an example embodiment of adjusting an equalization coefficient based on a state accumulation value.
Figure 15B:
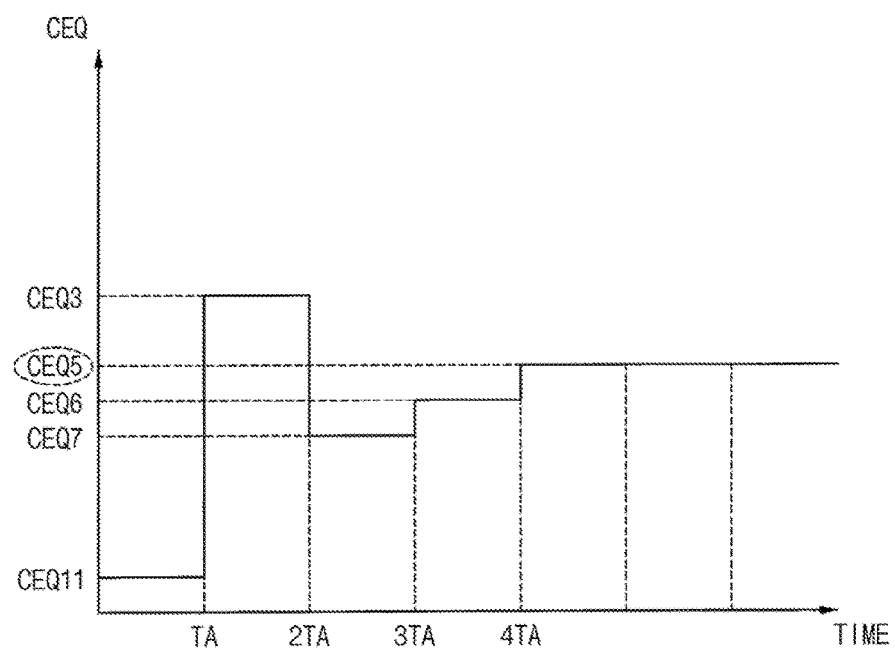

FIGS. 15A and 15B are diagrams illustrating an example embodiment of adjusting an equalization coefficient based on a state accumulation value.

Referring to FIGS. 15A and 15B, the control logic 600 in FIG. 4 may adjust the equalization coefficient CEQ per accumulation time interval, i.e., at time points TA~6TA.

In an example embodiment, as illustrated in FIG. 15A, the control logic 600 may sequentially increase or decrease the equalization coefficient CEQ by comparing the state accumulation value AVL with the reference values NTH and NTL. In an example embodiment, when the initial equalization coefficient CEQ is the eleventh equalization coefficient an CEQ11, the control logic 600 may sequentially decrease the equalization coefficient CEQ such that the equalization coefficient CEQ converges at the time point 6TA to a predetermined value, i.e., the fifth equalization coefficient value CEQ 5 corresponding to the well-equalized state. As another example, when the initial equalization coefficient CEQ is the first equalization coefficient an CEQ1, the control logic 600 may sequentially increase the equalization coefficient CEQ such that the equalization coefficient CEQ converges at the time point 4TA to the fifth equalization coefficient value CEQ5 corresponding to the well-equalized state.

In an example embodiment, as illustrated in FIG. 15B, the control logic 600 may adjust the equalization coefficient CEQ using a binary scan method by comparing the state accumulation value AVL with the reference values NTH and NTL. In an example embodiment, the control logic 600 may increase the equalization coefficient CEQ with a relatively large changing width from the eleventh equalization coefficient value CEQ11 to the third equalization coefficient vale CEQ3 at time point TA, decrease the equalization coefficient CEQ with a reduced changing width from the third equalization coefficient value CEQ3 to the seventh equalization coefficient vale CEQ7 at time point 2TA, and so on. Through such binary scan method, the equalization coefficient CEQ may converge rapidly at time point 4TA to the fifth equalization coefficient value CEQ5 corresponding to the well-equalized state.

Figure 16:
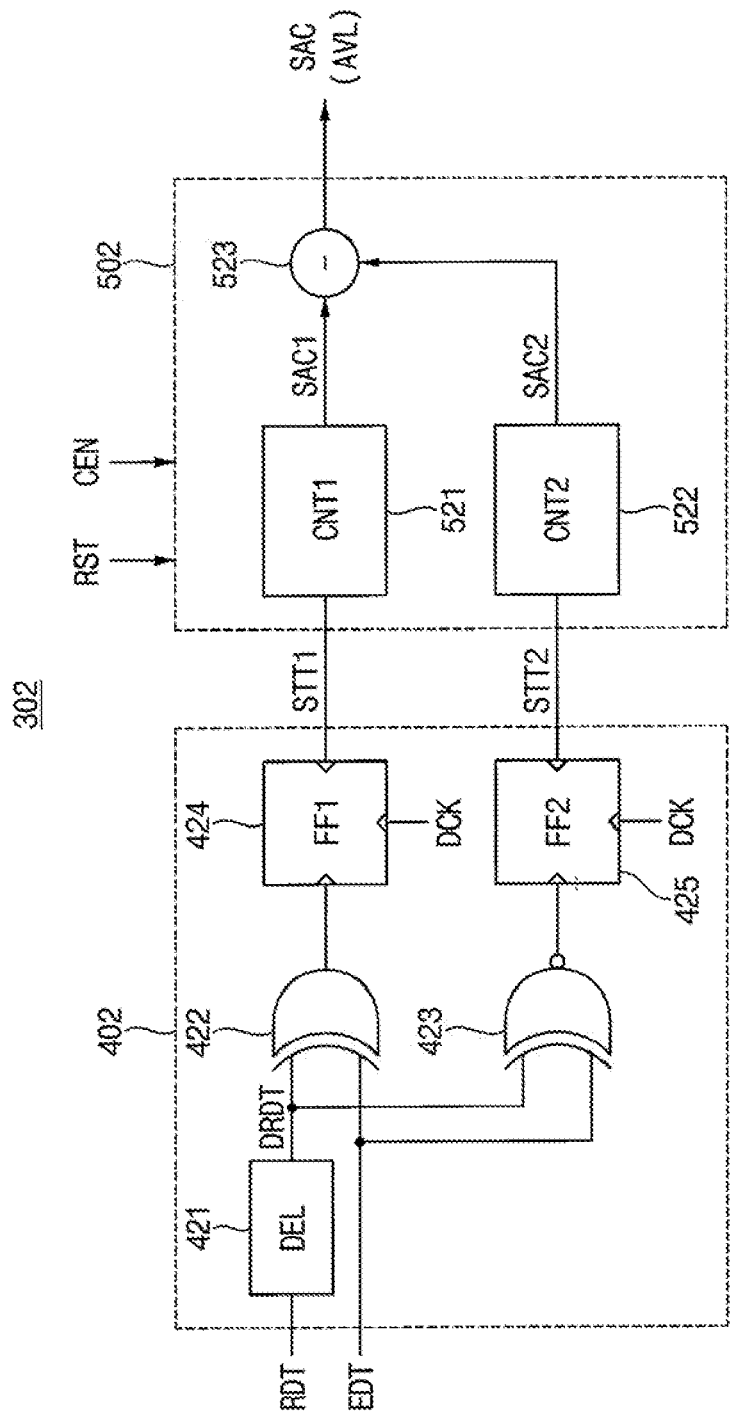
FIG. 16 is a diagram illustrating an example embodiment of an equalization control circuit included in a receiver circuit according to an example embodiment.

FIG. 16 is a diagram illustrating an example embodiment of an equalization control circuit included in a receiver circuit according to an example embodiment.

Referring to FIG. 16, an equalization control circuit 302 may include a state monitor 402 and an accumulator 502. The control logic as described with reference to FIG. 4 is omitted in FIG. 16, and descriptions repeated with FIG. 4 may be omitted.

The state monitor 402 may generate the state monitoring signal STT including the plurality of equalization state values by comparing, bit by bit, the plurality of data bits included in the data sample signal RDT and the plurality of edge bits included in the edge sample signal EDT.

The accumulator 502 may generate the state accumulation value AVL by accumulating the equalization state values during an accumulation time interval. The state accumulation value AVL may be included in an accumulator output signal SAC that is provided from the accumulator 502 to the control logic. The accumulator 501 may be initialized in response to the reset signal RST, and the accumulation time interval may be defined by the activation time interval of the accumulation enable signal CEN. The accumulator output signal SAC may maintain the state accumulation value AVL after the accumulation time interval until the accumulator 501 is reset again in response to the reset signal RST.

The state monitor 402 may include a delay circuit DEL 421, an XOR (exclusive-OR) gate 422, an XNOR (exclusive-NOR) gate 423, a first flip-flop FF1 424, and a second flip-flop FF2 425.

The delay circuit 421 may generate a delayed data sample signal DRDT by delaying the data sample signal RDT. In an example embodiment, the delay circuit 421 may delay the data sample signal RDT by the 1.5UI as described above with reference to FIGS. 8A through 10 to generate the delayed data sample signal DRDT.

The XOR gate 422 may perform an XOR logic operation on the delayed data sample signal DRDT and the edge sample signal EDT. The XOR gate 422 may output the value of 1 (that is, the logic high level H) when the two input bit values are equal, and output the value of 0 (that is, the logic low level L) when the two input bit values are different.

The XNOR gate 423 may perform an XNOR logic operation on the delayed data sample signal DRDT and the edge sample signal EDT. The XNOR gate 423 may output the value of 0 when the two input bit values are equal, and output the value of 1 when the two input bit values are different.

The first flip-flop 424 may generate a first state monitoring signal STT1 by latching an output of the XOR gate 422. The second flip-flop 425 may generate a second state monitoring signal STT2 by latching an output of the XNOR gate 423. In an example embodiment, the first flip-flop 424 and the second flip-flop 425 may perform the latching operation in synchronization with the data clock signal DCK.

The accumulator 501 may include a first counter CNT1 521, a second counter CNT2 522, and a subtractor 503.

The first counter 521 may increase a first stored value in the first counter 521 when each bit value in the first state monitoring signal STT1 is 1. The second counter 522 may increase a second stored value in the second counter 522 when each bit value in the second state monitoring signal STT2 is 0. The subtractor 523 may generate the state accumulation value AVL by subtracting an output of the second counter 522 from an output of the first counter 521.

As a result, the equalization control circuit 302 may increase the state accumulation value AVL by one when each data bit and each edge bit that are compared have equal values, and decrease the state accumulation AVL by one value when each data bit and each edge bit that are compared have different values.

Figure 17:
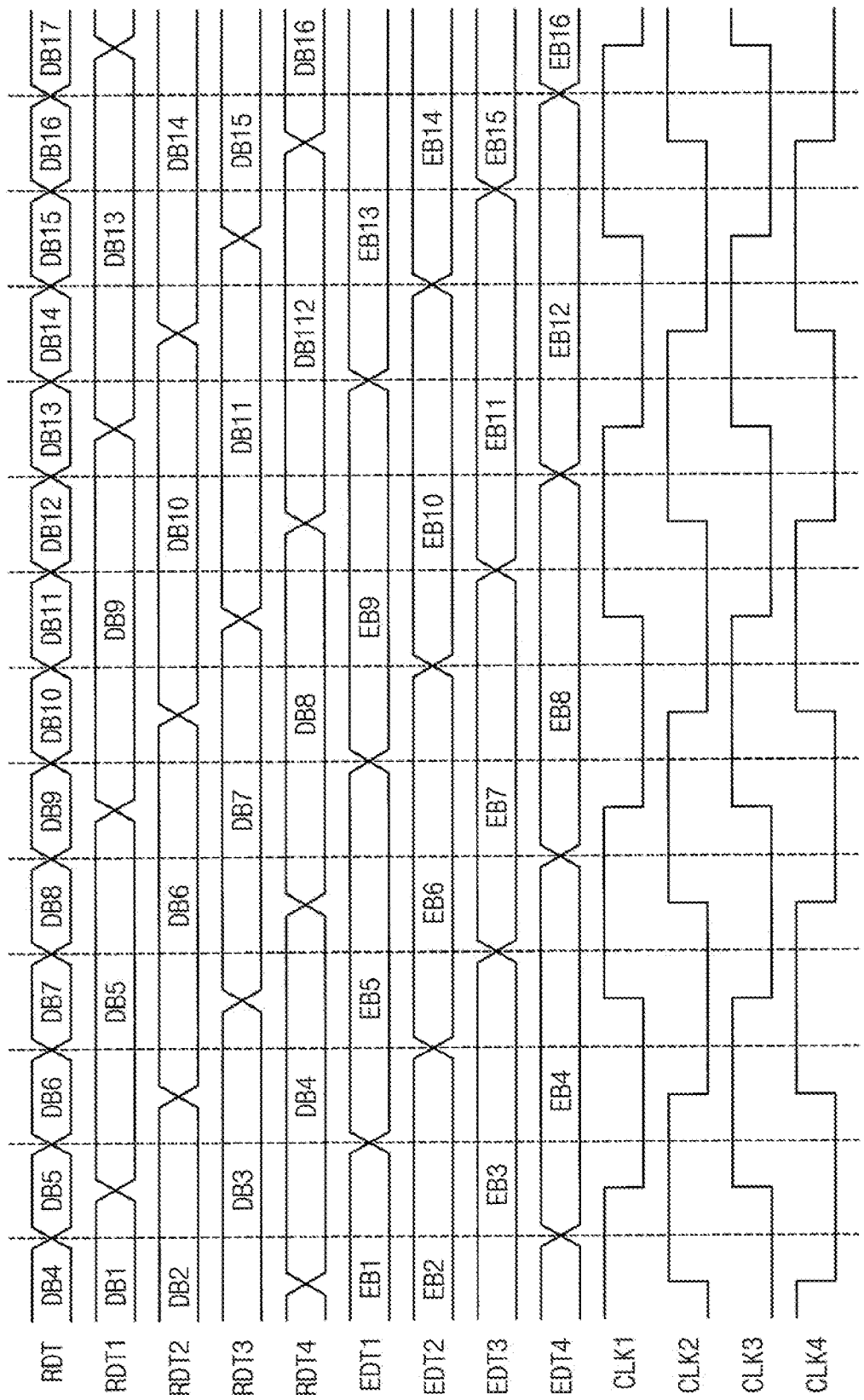
FIG. 17 is a timing diagram illustrating an example embodiment of a deserializing operation of a clock data recovery circuit included in a receiver circuit according to an example embodiment.
Figure 18:
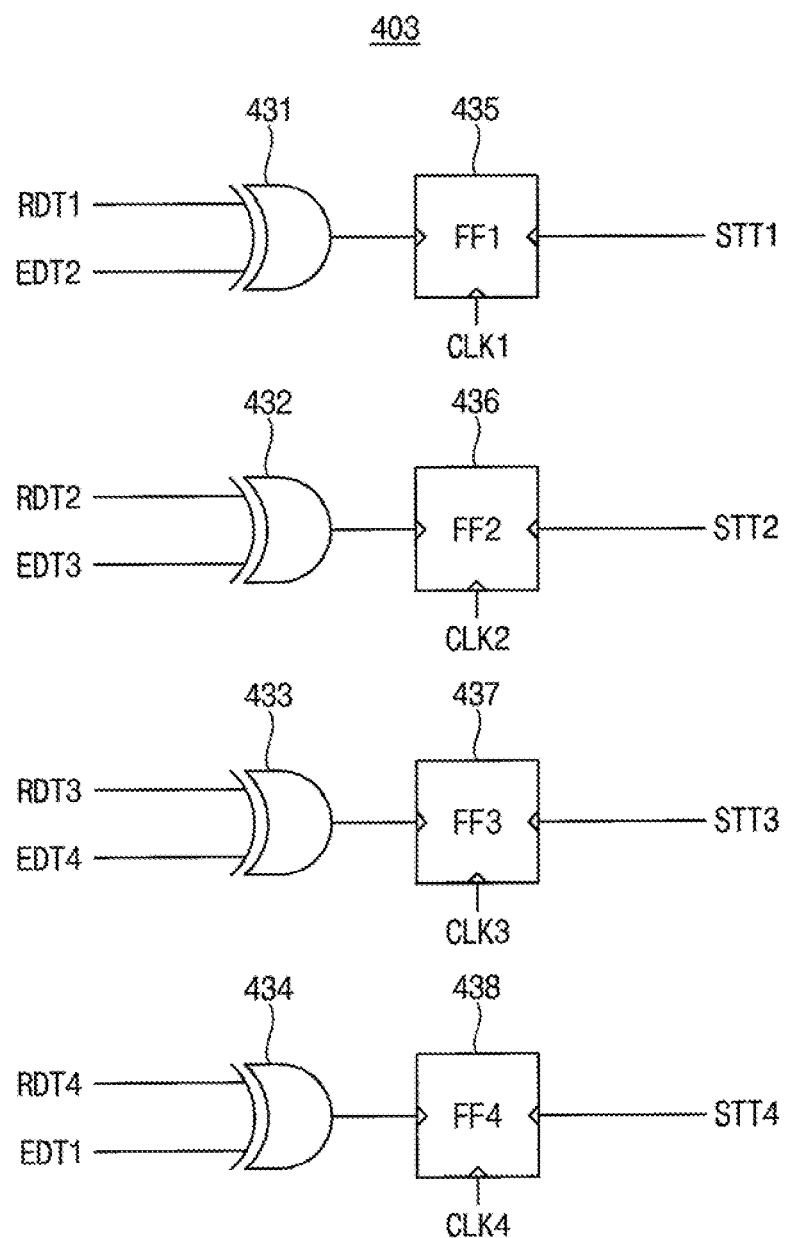
FIG. 18 is a diagram illustrating an example embodiment of a state monitor included in a receiver circuit according to an example embodiment.

FIG. 17 is a timing diagram illustrating an example embodiment of a deserializing operation of a clock data recovery circuit included in a receiver circuit according to an example embodiment, and FIG. 18 is a diagram illustrating an example embodiment of a state monitor included in a receiver circuit according to an example embodiment.

FIGS. 17 and 18 illustrate an example embodiment that each of the first deserializer 250 and the second deserializer 260 in FIG. 2 deserialize the data sample signal RDT into four parallel signals, although the specific number of parallel signals may be varied.

Referring to FIGS. 2 and 17, the first deserializer 250 may generate first through fourth parallel data sample signals RDT1~RDT4 by deserializing the data sample signal RDT including the data bits DB1~DB16. The second deserializer 260 may generate first through fourth parallel edge sample signals EDT1~EDT4 by deserializing the edge sample signal EDT. In this case, each edge bit may be aligned to the corresponding data bit without delaying the data sample signal RDT by the 1.5UI as described above with reference to FIGS. 11 and 12.

FIG. 18 illustrates an example embodiment of a state monitor to generate the state monitoring signal without delaying the data sample signal RDT.

Referring to FIG. 18, a state monitor 403 may include first through fourth XOR gates 431~434 and first through fourth flip-flops FF1~FF4 435~438. In an example embodiment, the first through fourth flip-flops 435~438 may perform the latching operation in synchronization with the data clock signal DCK.

Referring to FIGS. 17 and 18, the first XOR gate 431 may perform an XOR logic operation on the first data sample signal RDT1 and the second edge sample signal EDT2, and the first flip-flop 435 may generate a first state monitoring signal STT1 by latching an output of the first XOR gate 431 in synchronization with a first clock signal CLK1.

The second XOR gate 432 may perform an XOR logic operation on the second data sample signal RDT2 and the third edge sample signal EDT3, and the second flip-flop 436 may generate a second state monitoring signal STT2 by latching an output of the second XOR gate 432 in synchronization with a second clock signal CLK2.

The third XOR gate 433 may perform an XOR logic operation on the third data sample signal RDT3 and the fourth edge sample signal EDT4, and the third flip-flop 437 may generate a third state monitoring signal STT3 by latching an output of the third XOR gate 433 in synchronization with a third clock signal CLK3.

The fourth XOR gate 434 may perform an XOR logic operation on the fourth data sample signal RDT4 and the first edge sample signal EDT1, and the fourth flip-flop 438 may generate a fourth state monitoring signal STT4 by latching an output of the fourth XOR gate 434 in synchronization with a fourth clock signal CLK4.

As a result, the first through fourth state monitoring signals STT1~STT4 may include respectively divided portions of the above-described equalization state values. The above-described accumulator may generate the state accumulation value AVL based on at least one of the first through fourth state monitoring signals STT1~STT4.

As such, the equalization control circuit including the state monitor 403 of FIG. 18 may control the equalization coefficient by comparing data bits of an n-th parallel data sample signal of the plurality of parallel data sample signals and edge bits of an (n+1)-th parallel edge sample signal of the plurality of parallel edge sample signals, where n is a natural number.

Figure 19:
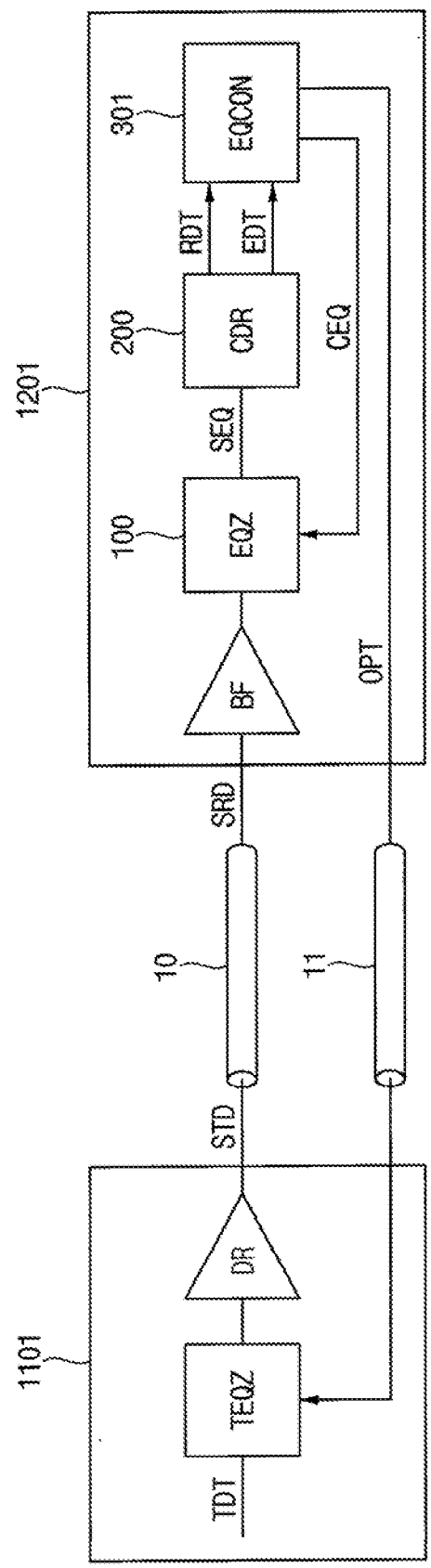
FIG. 19 is a block diagram illustrating a system including a receiver circuit according to an example embodiment.

FIG. 19 is a block diagram illustrating a system including a receiver circuit according to an example embodiment.

Referring to FIG. 19, a system 1001 includes a transmitter circuit 1101, a receiver circuit 1201, and a communication channel 10 connecting the transmitter circuit 1101 and the receiver circuit 1201.

The transmitter circuit 1101 may include a transmission equalizer TEQZ and a transmission driver DR. The transmission equalizer TEQZ may perform a transmission equalizing operation with respect to transmission data TDT as will be described below with reference to FIG. 20, and the transmission driver DR may output a transmission data signal STD to the communication channel 10 based on an output of the transmission equalizer TEQZ.

The receiver circuit 1201 may include the reception buffer BF, the equalizer EQZ 100, the clock data recovery circuit CDR 200, and the equalization control circuit EQCON 301.

The reception buffer BF may buffer and output an input data signal SRD transferred through the communication channel. The equalizer 100 may generate an equalization signal SEQ by equalizing the input data signal SRD based on an equalization coefficient CEQ. According to an example embodiment, the reception buffer BF may be omitted and the equalizer 100 may receive the input data signal SRD directly from the communication channel 10. An example embodiment of the equalizer 100 are the same as described with reference to FIGS. 5 and 6.

The clock data recovery circuit 200 may generate a data clock signal and an edge clock signal internally based on the equalization signal. The clock data recovery circuit 200 may generate the data sample signal RDT including a plurality of data bits by sampling the equalization signal SEQ in synchronization with the data clock signal. In addition, the clock data recovery circuit 200 may generate the edge sample signal EDT including a plurality of edge bits by sampling the equalization signal SEQ in synchronization with the edge clock signal. An example embodiment of the clock data recovery circuit 200 may be the same as described with reference to FIG. 2.

The equalization control circuit 301 may control the equalization coefficient CEQ by comparing the plurality of data bits in the data sample signal RDT and the plurality of edge bits in the edge sample signal EDT. As described with reference to FIGS. 3 through 18, the equalization control circuit 301 may generate a plurality of equalization state values by comparing, bit by bit, the plurality of data bits and the plurality of edge bits, and generates a state accumulation value by accumulating the equalization state values during an accumulation time interval.

In addition, the equalization control circuit 301 may provide equalization state information OPT to the transmitter circuit 1101 through an auxiliary communication channel 11. The transmission equalizer TEQZ of the transmitter circuit 1101 may perform the transmission equalizing operation such as pre-emphasis based on the equalization state information OPT.

As such, the receiver circuit 1201 according to an example embodiment may reduce jitters of the equalization signal SEQ with high accuracy by performing adaptive equalization digitally based on the data bits and the edge bits, and thus performance of the receiver circuit 1201 and the system 1001 including the receiver circuit 1201 may be enhanced. In addition, the receiver circuit 1201 according to an example embodiment may further enhance the performance of the system 1001 including the transmitter circuit 1101 and the receiver circuit 1201 by performing the transmission equalizing operation based on the equalization state information OPT.

Figure 20:
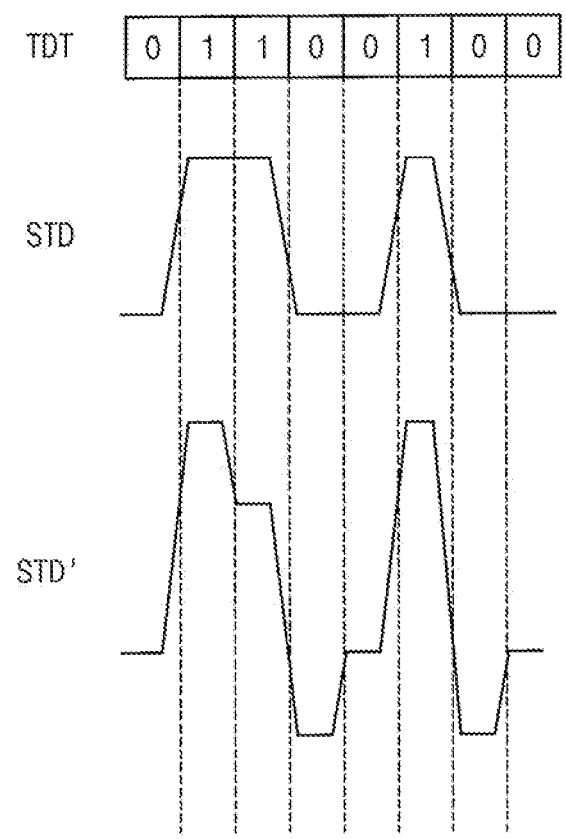
FIG. 20 is a diagram illustrating an example operation of a transmission equalizer included in the system of FIG. 19.

FIG. 20 is a diagram illustrating an example operation of a transmission equalizer included in the system of FIG. 19.

Referring to FIGS. 19 and 20, the transmission data TDT may include data bits as illustrated in FIG. 20, and the transmission equalizer TEQZ may perform the transmission equalizing operation, e.g., the pre-emphasis of the transmission data TDT.

The pre-emphasis indicates the operation that the transmission equalizer TEQZ imposes an effect to a signal in advance, before the signal is output to the communication channel 10, such that the effect may cancel out the characteristics of the communication channel 10. Through the imposed effect, the waveform of the signal may be changed to the desired waveform while the signal is transferred through the communication channel 10.

In FIG. 20, SDT indicates the transmission data signal when the pre-emphasis is not performed, and STD' indicates the transmission data signal when the pre-emphasis is performed. The transmission equalizer TEQZ may adjust the strength of the pre-emphasis based on the equalization state information OPT provided from the receiver circuit 1201.

Figure 21:
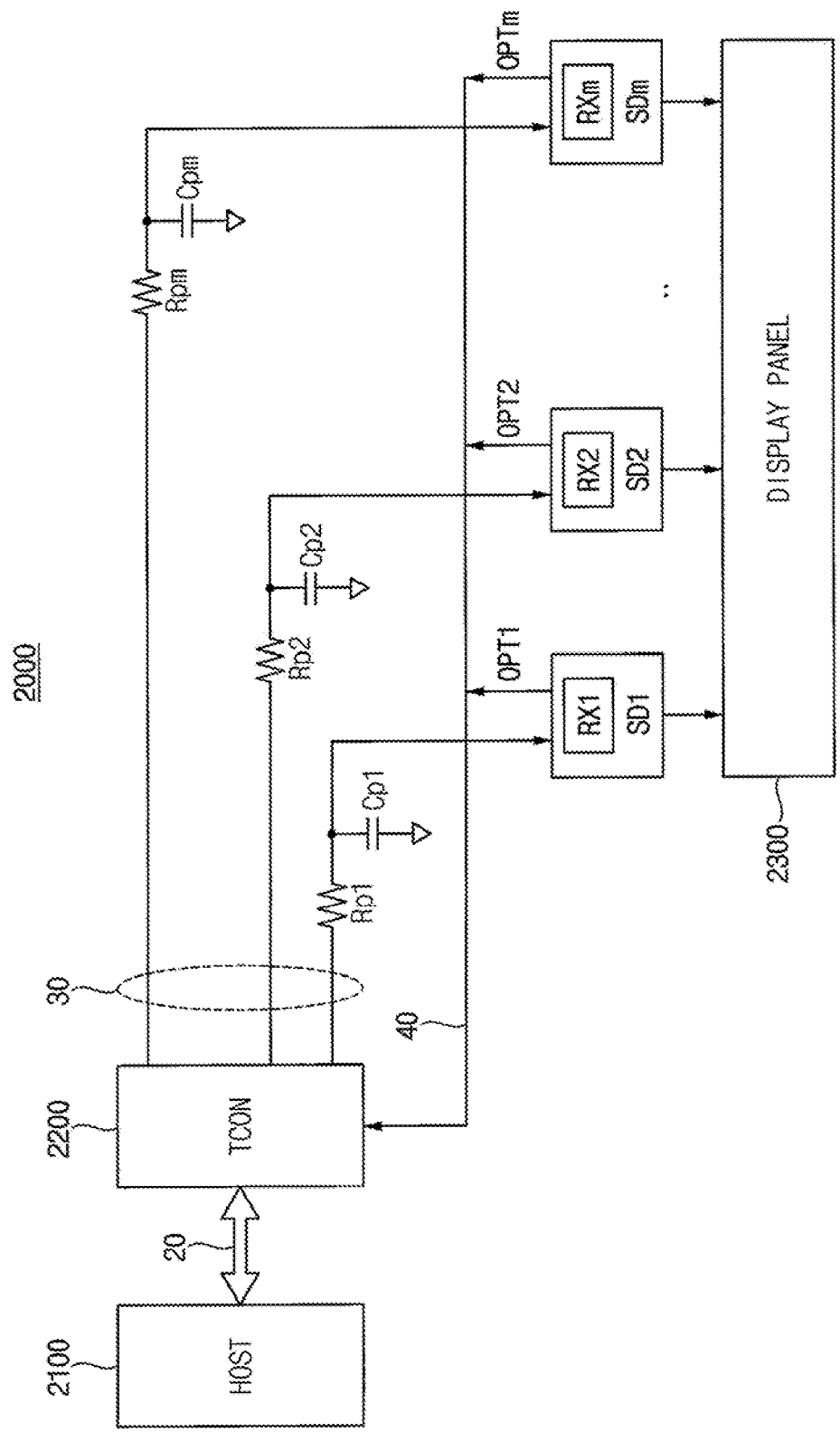
FIG. 21 is a block diagram illustrating a system including a receiver circuit according to an example embodiment.

FIG. 21 is a block diagram illustrating a system 2000 including a display driving circuit. The above-described method and circuitry of controlling the equalization may be applied to the system 2000 of FIG. 21. For convenience of description, a display panel 2300 is illustrated in FIG. 21.

Referring to FIG. 21, the displaying driving circuit may include a timing controller TCON 2200, a plurality of source drivers SD1~SDm, a data transmission channel 30, and a share back channel 40.

The timing controller 2200 may transmit data to the plurality of source drivers SD1~SDm. The data transmitted to the plurality of source drivers SD1~SDm may be packet data including display data. Each of the plurality of source drivers SD1~SDm may drive one or more data lines of the display panel 2300 based on the received data.

The timing controller 2200 may transmit and receive data with the plurality of source drivers SD1~SDm through the data transmission channel 30. An interface scheme between the timing controller 2200 and the plurality of source drivers SD1~SDm may be referred to as an intra-panel interface.

In addition, timing controller 2200 may transmit and receive data with a host device 2100 through a communication channel 20. An interface scheme between the timing controller 2200 and the host device 2100 may be referred to as an inter-panel interface.

Hereinafter, an operation of the display driving integrated circuit by a high speed interface scheme will be described.

The timing controller 2200 may be connected to the plurality of source drivers SD1~SDm in a point-to-point manner, and may transmit data to each of the plurality of source drivers SD1~SDm through different data transmission channels 30. Distances between the timing controller 2200 and the plurality of source drivers SD1~SDm may be different from each other. Thus, lengths of the data transmission channels 30 may be different from each other, and parasitic resistances Rp1~Rpm of the data transmission channels 30 and parasitic capacitances Cp1~Cpm of the data transmission channels 30 may be different from each other. Accordingly, impedance and frequency characteristics of the data transmission channels 30 may be different from each other, and thus, the plurality of source drivers SD1~SDm may perform training for optimizing a receiving operation according to impedance and frequency characteristics of transmission channels corresponding thereto.

In more detail, each of the plurality of source drivers SD1~SDm may optimize the receiving operations of receiver circuits RX1~RXm through training. The plurality of source drivers SD1~SDm respectively determine parameter values OPT1~OPTm of the receiver circuits RX1~RXm by optimizing the receiving operations and transmit the parameter values OPT1~OPTm to the timing controller 2200. In an example embodiment, the plurality of source drivers SD1~SDm may respectively transmit the parameter values OPT1~OPTm to the timing controller 2200 in response to (i.e., based on) a read command received from the timing controller 2200.

The plurality of source drivers SD1~SDm may be connected to the timing controller 2200 in a multi-drop manner through the share back channel 40. In an example embodiment, the share back channel 40 may be configured as one signal line. The plurality of source drivers SD1~SDm may sequentially transmit the parameter values OPT1~OPTm to the timing controller 2200 through the share back channel 40. At least one among the plurality of source drivers SD1~SDm may transmit a state information signal indicating an abnormal state in connection with a receiving operation, i.e., when a receive abnormality state occurs, to the timing controller 2200 through the share back channel 40.

As described above, a system according to an example embodiment may include a first device including a transmitter circuit and a second device including a receiver circuit.

In an example embodiment, the first device may correspond to the host device 2100 configured to output the display data to the communication channel 20, and the second device may correspond to the display device configured to display images based on the received display data. In this case, the receiver circuit according to an example embodiment may be included in the timing controller 2200 of the display device.

In an example embodiment, the first device may correspond to the timing controller 2200 host device 2100, and the second device may correspond to each of the plurality of source drivers SD1~SDm. In this case, the receiver circuit according to an example embodiment may be included in each of the plurality of source drivers SD1~SDm.

Figure 22:
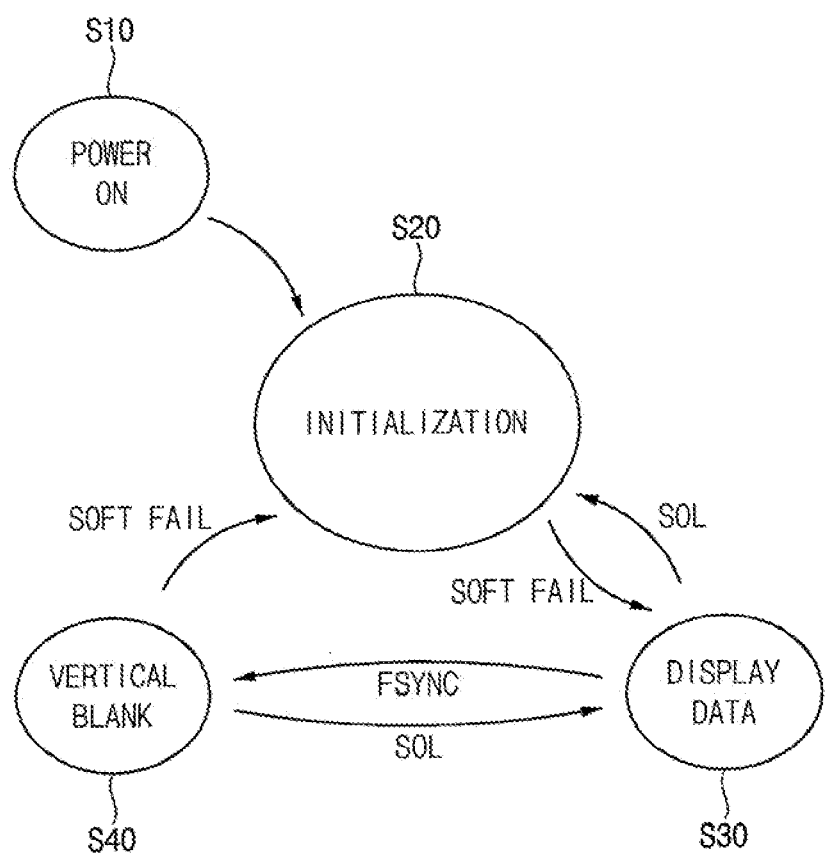
FIG. 22 is a diagram illustrating operation modes of the system of FIG. 21.

FIG. 22 is a diagram illustrating operation modes of the system of FIG. 21.

Referring to FIGS. 21 and 22, the operation modes of the display driving circuit may include an initialization mode S20, a display data mode S30, and a vertical blank mode S40. A period in which the display driving circuit operates in the initialization mode S20 may be referred to as an initialization period. A period in which the display driving circuit operates in the display data mode S30 or the vertical blank mode S40 may be referred to as a display period.

When the display driving circuit operates in the initialization mode S20, the display driving circuit may perform first initialization or second initialization. When the display driving circuit performs first initialization, the plurality of source drivers SD1~SDm may perform full initialization and optimization of a receiving unit. When the display driving circuit performs second initialization, the plurality of source drivers SD1~SDm may perform partial initialization of the receiving unit. In an example embodiment, when the display driving circuit performs first initialization, the plurality of source drivers SD1~SDm may perform DC training and AC training based on a training pattern that is provided from the timing controller 2200. DC training may optimize a receive characteristic of the receiving unit irrespective of the outside, e.g., a signal received from the timing controller 2200, and may include, e.g., impedance matching, offset calibration, etc. AC training may optimize the receive characteristic based on the training pattern received from the timing controller 2200 and may include, e.g., a system clock recovery, an equalization parameter determination, etc.

The plurality of source drivers SD1~SDm may initialize and optimize the receiving unit through first initialization, and may determine a parameter value of the receiving unit. When the display driving circuit performs second initialization, the plurality of source drivers SD1~SDm may perform partial initialization during AC training. In an example embodiment, the plurality of source drivers SD1~SDm may recover a system clock by performing clock recovery training.

In an example embodiment, first initialization may be performed during a first initialization period after power is supplied to the display driving circuit. In an example embodiment, first initialization may be performed periodically at a preset time units or intervals or according to a preset condition.

The display driving circuit may perform first initialization if the display driving circuit, e.g., the timing controller 2200 and the plurality of source drivers SD1~SDm, is powered on S10. Each of the plurality of source drivers SD1~SDm may optimize the receiving unit through training, e.g., DC training and AC training, and may store the parameter value of the receiving unit in an internally provided register.

Thereafter, the display driving circuit operates in the display data mode S30. The timing controller 2200 may inform a start of the display data mode S30 by transmitting a data packet including a start of line SOL to the plurality of source drivers SD1~SDm in the display period. The timing controller 2200 may transmit display data corresponding to each of lines of an image frame to each of the plurality of source drivers SD1~SDm. In this regard, the timing controller 2200 may sequentially transmit the display data and a read command requesting to read the parameter value to the plurality of source drivers SD1~SDm. A source driver that received the read command may transmit the parameter value stored in the register to the timing controller 2200. The timing controller 2200 may store the received parameter value.

When the display data corresponding to one image frame is transmitted, the display driving circuit operates in the vertical blank mode S40. The timing controller 2200 may inform an end of the display data mode S30 by transmitting display data including a frame synchronization signal FSYNC to the plurality of source drivers SD1~SDm.

In an example embodiment, during the vertical blank mode S40, the display driving circuit may perform second initialization. The timing controller 2200 may transmit a training pattern to each of the plurality of source drivers SD1~SDm. Each of the plurality of source drivers SD1~SDm may perform system clock recovery training based on the training pattern.

The display data mode S30 and the vertical blank mode S40 may be repeatedly performed for each image frame. The display data mode S30 and the vertical blank mode S40 may be repeatedly performed until the display driving circuit is powered off or a soft fail (SOFT FAIL) occurs in one among the plurality of source drivers SD1~SDm.

When the operation mode of the display driving circuit is changed from the vertical blank mode S40 to the display data mode S30, the timing controller 2200 may transmit packet data including the line start field SOL to the plurality of source drivers SD1~SDm. When the operation mode of the display driving circuit is changed from the display data mode S30 to the vertical blank mode S40, the timing controller 2200 may transmit packet data including the frame synchronization signal F SYNC to the plurality of source drivers SD1~SDm.

When the soft fail occurs in at least one among the plurality of source drivers SD1~SDm in the display period, the display driving circuit may perform initialization. The soft fail may occur, e.g., when a wrong system clock is output because a clock recovery circuit included in a receiving unit is in an unlock state or when an inner setting value of the receiving unit is changed due to an ESD.

In this regard, the plurality of source drivers SD1~SDm may recover a system clock by performing second initialization and may optimize a receiving operation of the receiving unit based on the parameter value received from the timing controller 2200. Each of the plurality of source drivers SD1~SDm may recover the system clock based on the training pattern received from the timing controller 2200. The timing controller 2200 may transmit the parameter value stored in the display data mode S30 to the plurality of source drivers SD1~SDm. The timing controller 2200 may provide the parameter value corresponding to each of the plurality of source drivers SD1~SDm. Each of the plurality of source drivers SD1~SDm may promptly optimize the receiving operation of the receiving unit based on the received parameter value. Thereafter, the display driving circuit may operate in the display data mode S30.

Figure 23:
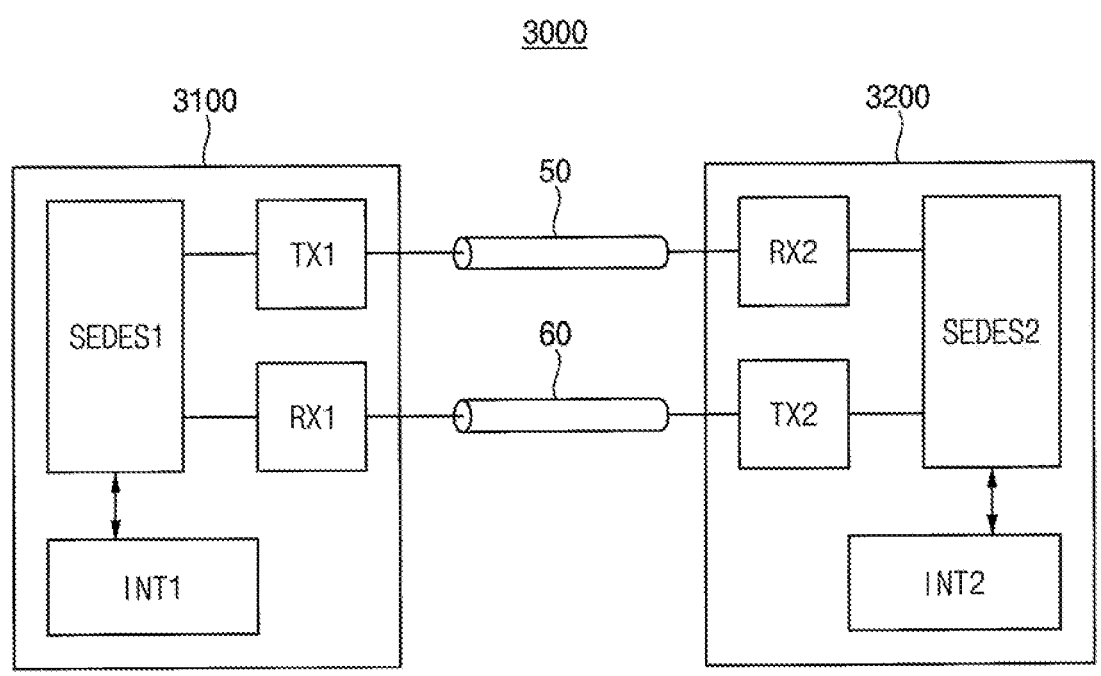
FIG. 23 is a block diagram illustrating a system including a receiver circuit according to an example embodiment.

FIG. 23 is a block diagram illustrating a system including a receiver circuit according to an example embodiment.

FIG. 23 illustrates an electronic system 3000 performing a bi-directional communication. Referring to FIG. 23, the system the electronic system 3000 may include electronic devices 3100 and 3200. In an example embodiment, each of the electronic devices 3100 and 3200 may be implemented as one of various electronic devices such as a desktop computer, a laptop computer, a tablet computer, a smart phone, a wearable device, a video game console, a home appliance, a medical device, and/or the like. In another example embodiment, the electronic system 3000 may be implemented as a single electronic device. Each of the electronic devices 3100 and 3200 may be a component or an intellectual property (IP), which may be included in the single electronic device, and may be implemented as a circuit, a module, a chip, and/or a package-level entity. The terms "system" and "device" are provided to facilitate better understanding, and are not intended to limit an example embodiment.

The electronic devices 3100 and 3200 may exchange data/signals through communication channels 50 and 60 while communicating with each other. Each of the communication channels 50 and 60 may include a conductive material to transfer the data/signals. In an example embodiment, each of the communication channels 50 and 60 may be implemented as a trace pattern on a printed circuit board (PCB), a wire, a cable, a metal pin/pad of a connector, and/or the like. FIG. 23 illustrate an example embodiment of the two uni-directional communication channels 50 and 60, which may be combined into one bi-directional communication channel in an example embodiment.

The electronic device 3100 may include functional circuits INT1, a serializer/deserializer SEDES1, a transmitter circuit TX1, and a receiver circuit RX1. The electronic device 3200 may include functional circuits INT2, a serializer/deserializer SEDES2, a transmitter circuit TX2, and a receiver circuit RX2.

The functional circuits INT1 and INT2 may be configured to perform functions of the electronic devices 3100 and 3200, respectively. In an example embodiment, the functional circuits INT1 and INT2 may constitute various components or IPs, such as at least one processor (e.g., a central processing unit (CPU), an application processor (AP), and/or the like), a memory, an image sensor, a display device, and/or the like.

The electronic devices 3100 and 3200 may be implemented as separate components, IPs, or devices. In an example embodiment, the electronic device 3100 may be an external device to the electronic device 3200, and the electronic device 3200 may be an external device to the electronic device 3100.

The serializer/deserializer SEDES1 may be configured to serialize data generated depending on operations of the functional circuits INT1. The serializer/deserializer SEDES1 may provide the serialized data to the transmitter circuit TX1. The transmitter circuit TX1 may transmit the serialized signal to the electronic device 3200 through the communication channel 50. The receiver circuit RX2 may equalize the signal received through the communication channel 50 and recover clock and data based on the equalization signal. The serializer/deserializer SEDES2 may deserialize the signal from the receiver circuit RX2 to provide the deserialized data to the functional circuits INT2.

The serializer/deserializer SEDES2 may be configured to serialize data generated depending on operations of the functional circuits INT2. The serializer/deserializer SEDES2 may provide the serialized data to the transmitter circuit TX2. The transmitter circuit TX2 may transmit the serialized signal to the electronic device 3100 through the communication channel 60. The receiver circuit RX1 may equalize the signal received through the communication channel 60, and recover clock and data based on the equalization signal. The serializer/deserializer SEDES1 may deserialize the signal from the receiver circuit RX1 to provide the deserialized data to the functional circuits INT1.

In such a manner, the electronic devices 3100 and 3200 may exchange data/signals with each other through the communication channels 50 and 60. When a speed of communication between the electronic devices 3100 and 3200 is increased (e.g., when the communication is performed at a higher frequency or a larger bandwidth), the electronic devices 3100 and 3200 may exchange a larger amount of data relative to time.

However, due to various causes such as skin effect, dielectric loss, and the like, each of the communication channels 1210 and 1250 may exhibit a low-pass frequency response characteristic. Thus, in a high-speed operation, bandwidths of the communication channels 1210 and 1250 may be limited and may become smaller than a bandwidth of the signals. This may weaken high frequency components of the signals transferred through the communication channels 1210 and 1250, and may cause inter-symbol interference on a time domain. As a result, as a speed for transferring the signals gets faster, the distortion of the signals may become more severe and quality of the signals may become degraded.

According to an example embodiment, at least one of the receiver circuits RX1 and RX2 may include an equalizer, a clock and data recovery circuit, and an equalization control circuit to perform the adaptive equalization digitally based on the data bits and the edge bits, as described above.

To compensate the unintended distortion of the signals, the equalizers in the receiver circuits RX1 and RX2 may perform equalization on the signals, and the equalizers in the transmitter circuit TX1 and TX2 may perform a pre-equalization on the signals. The equalizers included in the transmitter circuits TX1 and TX2 may be referred to as transmission equalizers, and the equalizers included in the receiver circuits RX1 and RX2 may be referred to as reception equalizers.

FIG. 24 is a block diagram illustrating an example embodiment of an interface employable in a computing system according to an example embodiment.

Referring to FIG. 21, a computing system 4100 may be implemented by a data processing device that uses or supports a mobile industry processor interface (MIPI) interface. The computing system 4100 may include an application processor 4110, a three-dimensional image sensor 4140, a display device 4150, etc. A CSI host 4112 of the application processor 4110 may perform a serial communication with a CSI device 4141 of the three-dimensional image sensor 4140 via a camera serial interface (CSI). In an example embodiment, the CSI host 4112 may include a deserializer (DES), and the CSI device 4141 may include a serializer (SER). A DSI host 4111 of the application processor 4110 may perform a serial communication with a DSI device 4151 of the display device 4150 via a display serial interface (DSI).

In an example embodiment, the DSI host 4111 may include a serializer (SER), and the DSI device 1151 may include a deserializer (DES). The computing system 4100 may further include a radio frequency (RF) chip 4160 performing a communication with the application processor 4110. A physical layer (PHY) 4113 of the computing system 4100 and a physical layer (PHY) 4161 of the RF chip 4160 may perform data communications based on a MIPI DigRF. The application processor 4110 may further include a DigRF MASTER 4114 that controls the data communications of the PHY 4161.

The computing system 4100 may further include a global positioning system (GPS) 4120, a storage 4170, a MIC 4180, a DRAM device 4185, and a speaker 4190. In addition, the computing system 4100 may perform communications using an ultra wideband (UWB) 4120, a wireless local area network (WLAN) 4220, a worldwide interoperability for microwave access (WIMAX) 4130, etc. However, the structure and the interface of the computing system 4100 are not limited thereto.

As described above, a receiver circuit according to an example embodiment may reduce jitter of an equalization signal with high accuracy by performing adaptive equalization digitally based on data bits and edge bits, and thus performance of the receiver circuit and a system including the receiver circuit may be enhanced. Example embodiments may provide a receiver circuit and a system including the receiver circuit, capable of efficiently performing adaptive equalization of a signal received through a communication channel.

Embodiments may be applied to any electronic devices and systems operating with high speed data communication. In an example embodiment, embodiments may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A receiver circuit, comprising:
   an equalizer configured to generate an equalization signal by equalizing an input data signal transferred through a communication channel based on an equalization coefficient;
   a clock data recovery circuit configured to generate a data clock signal and an edge clock signal based on the equalization signal, generate a data sample signal including a plurality of data bits by sampling the equalization signal in synchronization with the data clock signal, and generate an edge sample signal including a plurality of edge bits by sampling the equalization signal in synchronization with the edge clock signal; and
   an equalization control circuit configured to control the equalization coefficient by comparing the plurality of data bits and the plurality of edge bits, wherein:
   the equalization control circuit generates a plurality of equalization state values by comparing, bit by bit, the plurality of data bits and the plurality of edge bits, and generates a state accumulation value by accumulating the equalization state values during an accumulation time interval, and
   the equalization control circuit increases the state accumulation value when each data bit and each edge bit that are compared have equal values, and decreases the state accumulation value when each data bit and each edge bit that are compared have different values.

2. The receiver circuit as claimed in claim 1, wherein the equalization control circuit determines an equalization state of the equalizer by comparing each data bit of the plurality of data bits with each edge bit of the plurality of edge bits, each edge bit being sampled later than each corresponding data bit.

3. The receiver circuit as claimed in claim 2, wherein the equalization control circuit determines the equalization state of the equalizer by comparing each data bit of the plurality of data bits with each edge bit of the plurality of edge bits, each edge bit being sampled one and a half of a unit interval later than each corresponding data bit, the unit interval indicating a time interval between two adjacent data bits of the input data signal.

4. The receiver circuit as claimed in claim 1, wherein the equalization control circuit generates each equalization state value of 1 when each data bit and each edge bit that are compared have equal values, and generates each equalization state value of 0 when each data bit and each edge bit that are compared have different values.

5. The receiver circuit as claimed in claim 1, wherein the equalization control circuit includes at least one XOR gate configured to perform an XOR logic operation, bit by bit, on the plurality of data bits and the plurality of edge bits to output the plurality of equalization state values.

6. The receiver circuit as claimed in claim 1, wherein the equalization control circuit determines that the equalizer is in an under-equalized state when the state accumulation value is greater than a first reference value, and determines that the equalizer is in an over-equalized state when the state accumulation value is smaller than a second reference value.

7. The receiver circuit as claimed in claim 6, wherein the equalization control circuit increases the equalization coefficient to increase equalization strength of the equalizer when it is determined that the equalizer is in the under-equalized state, and decreases the equalization coefficient to decrease the equalization strength of the equalizer when it is determined that the equalizer is in the over-equalized state.

8. The receiver circuit as claimed in claim 1, wherein the equalization control circuit generates a plurality of state accumulation values corresponding to a plurality of accumulation time intervals, and controls the equalization coefficient based on the plurality of state accumulation values until the equalization coefficient converges to a predetermined value.

9. The receiver circuit as claimed in claim 1, wherein:
   the clock data recovery circuit generates a plurality of parallel data sample signals by deserializing the data sample signal, and generates a plurality of parallel edge sample signals by deserializing the edge sample signal, and
   the equalization control circuit controls the equalization coefficient by comparing data bits of an n-th parallel data sample signal of the plurality of parallel data sample signals and edge bits of an (n+1)-th parallel edge sample signal of the plurality of parallel edge sample signals, where n is a natural number.

10. The receiver circuit as claimed in claim 1, wherein the clock data recovery circuit includes:
    a data sampler configured to generate the data sample signal including the plurality of data bits by sampling the equalization signal in synchronization with the data clock signal;

an edge sampler configured to generate the edge sample signal including the plurality of edge bits by sampling the equalization signal in synchronization with the edge clock signal; and a clock recovery circuit configured to generate the data clock signal and the edge clock signal based on the data sample signal and the edge sample signal.

11. The receiver circuit as claimed in claim 10, wherein the clock data recovery circuit further includes:

a first deserializer configured to generate a plurality of parallel data sample signals by deserializing the data sample signal; and a second deserializer configured to generate a plurality of parallel edge sample signals by deserializing the edge sample signal.

12. The receiver circuit as claimed in claim 1, wherein the equalization control circuit includes:

a state monitor configured to generate the plurality of equalization state values by comparing, bit by bit, the plurality of data bits and the plurality of edge bits;

an accumulator configured to generate the state accumulation value by accumulating the equalization state values during the accumulation time interval; and a control logic configured to control the equalization coefficient based on the state accumulation value.

13. The receiver circuit as claimed in claim 12, wherein: the state monitor includes:

a delay circuit configured to generate a delayed data sample signal by delaying the data sample signal;

an XOR gate configured to perform an XOR logic operation on the delayed data sample signal and the edge sample signal; and a flip-flop configured to generate a state monitoring signal including the plurality of equalization state values by latching an output of the XOR gate, and the accumulator includes a counter configured to generate the state accumulation value by increasing a stored value in the counter when each equalization state value is 1, and decreasing the stored value in the counter when each equalization state value is 0.

14. The receiver circuit as claimed in claim 12, wherein: the state monitor includes:

a delay circuit configured to generate a delayed data sample signal by delaying the data sample signal;

an XOR gate configured to perform an XOR logic operation on the delayed data sample signal and the edge sample signal;

an XNOR gate configured to perform an XNOR logic operation on the delayed data sample signal and the edge sample signal;

a first flip-flop configured to generate a first state monitoring signal by latching an output of the XOR gate; and a second flip-flop configured to generate a second state monitoring signal by latching an output of the XNOR gate, and the accumulator includes:

a first counter configured to increase a first stored value in the first counter when each bit value in the first state monitoring signal is 1;

a second counter configured to increase a second stored value in the second counter when each bit value in the second state monitoring signal is 0; and a subtractor configured to generate the state accumulation value by subtracting an output of the second counter from an output of the first counter.

15. A system, comprising:

a communication channel;

a first device configured to output a transmission data signal to the communication channel based on transmission data; and a second device comprising a receiver circuit connected to the communication channel, the receiver circuit including:

an equalizer configured to generate an equalization signal by equalizing an input data signal transferred through the communication channel based on an equalization coefficient;

a clock data recovery circuit configured to generate a data clock signal and an edge clock signal based on the equalization signal, generate a data sample signal including a plurality of data bits by sampling the equalization signal in synchronization with the data clock signal, and generate an edge sample signal including a plurality of edge bits by sampling the equalization signal in synchronization with the edge clock signal; and an equalization control circuit configured to control the equalization coefficient by comparing the plurality of data bits and the plurality of edge bits wherein:

the equalization control circuit generates a plurality of equalization state values by comparing, bit by bit, the plurality of data bits and the plurality of edge bits, and generates a state accumulation value by accumulating the equalization state values during an accumulation time interval, and the equalization control circuit increases the state accumulation value when each data bit and each edge bit that are compared have equal values, and decreases the state accumulation value when each data bit and each edge bit that are compared have different values.

16. The system as claimed in claim 15, wherein the first device is a host device that provides display data as the transmission data to the second device through the communication channel, the second device is a display device that displays an image based on the display data, and the receiver circuit is included in a timing controller of the display device.

17. The system as claimed in claim 15, wherein the first device is a timing controller of a display device, the second device is a source driver of the display device, and the receiver circuit is included in the source driver.

18. A receiver circuit, comprising:

an equalizer configured to generate an equalization signal by equalizing an input data signal transferred through a communication channel based on an equalization coefficient;

a data sampler configured to generate a data sample signal including a plurality of data bits by sampling the equalization signal in synchronization with a data clock signal;

an edge sampler configured to generate an edge sample signal including a plurality of edge bits by sampling the equalization signal in synchronization with an edge clock signal;

a clock recovery circuit configured to generate the data clock signal and the edge clock signal based on the data sample signal and the edge sample signal;

a state monitor configured to generate a plurality of equalization state values by comparing, bit by bit, the plurality of data bits and the plurality of edge bits;

an accumulator configured to generate a state accumulation value by accumulating the equalization state values during an accumulation time interval, wherein the accumulator increases the state accumulation value when each data bit and each edge bit that are compared have equal values, and decreases the state accumulation value when each data bit and each edge bit that are compared have different values; and a control logic configured to control the equalization coefficient based on the state accumulation value.

* * * * *